(12) United States Patent
Ki et al.

(10) Patent No.: US 11,598,571 B2
(45) Date of Patent: Mar. 7, 2023

(54) VACUUM ADIABATIC BODY AND REFRIGERATOR

(71) Applicant: LG ELECTRONICS INC., Seoul (KR)

(72) Inventors: Duchan Ki, Seoul (KR); Wonyeong Jung, Seoul (KR); Deokhyun Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 138 days.

(21) Appl. No.: 16/981,138

(22) PCT Filed: Jun. 26, 2019

(86) PCT No.: PCT/KR2019/007765
§ 371 (c)(1),
(2) Date: Sep. 15, 2020

(87) PCT Pub. No.: WO2020/004957
PCT Pub. Date: Jan. 2, 2020

(65) Prior Publication Data
US 2021/0088268 A1    Mar. 25, 2021

(30) Foreign Application Priority Data

Jun. 27, 2018   (KR) .......................... 10-2018-0074307

(51) Int. Cl.
*F25D 21/08*       (2006.01)
*F25D 23/06*       (2006.01)
(Continued)

(52) U.S. Cl.
CPC ........... *F25D 21/08* (2013.01); *F25D 23/065* (2013.01); *F16L 59/065* (2013.01); *F25D 29/005* (2013.01);
(Continued)

(58) Field of Classification Search
CPC ...... F25D 21/04; F25D 21/08; F25D 2201/14; F25D 23/063; F25D 23/065; F25D 2400/02; F25D 2400/40; F25D 29/005
See application file for complete search history.

(56) References Cited

U.S. PATENT DOCUMENTS 2,000,882 A    5/1935  Comstock
4,180,297 A   12/1979  Abrams
(Continued)

FOREIGN PATENT DOCUMENTS

CN       102452522      5/2012
CN       102455104      5/2012
(Continued)

OTHER PUBLICATIONS

Chinese Office Action issued in Application No. 2019800243856 dated Jul. 14, 2021.
(Continued)

*Primary Examiner* — Filip Zec
(74) *Attorney, Agent, or Firm* — KED & Associates LLP

(57) ABSTRACT

A vacuum adiabatic body between a first space and a second space includes an alternating current line through which AC current flows as a driving source, a direct current line through which direct current flows as a driving source, and a signal line through which a control signal flows as electric lines configured to electrically connect the first space to the second space. Thus, the number of lines passing through the vacuum adiabatic body may be reduced.

24 Claims, 36 Drawing Sheets

(51) Int. Cl.
*F16L 59/065* (2006.01)
*F25D 29/00* (2006.01)

(52) U.S. Cl.
CPC ...... *F25D 2201/14* (2013.01); *F25D 2400/02* (2013.01); *F25D 2400/40* (2013.01)

(56) References Cited

U.S. PATENT DOCUMENTS

| | | | |
|---|---|---|---|
| 4,638,644 A * | 1/1987 | Gidseg | F25D 17/065 |
| | | | 62/329 |
| 4,805,293 A | 2/1989 | Buchser | |
| 10,531,597 B1 * | 1/2020 | Eichelberg | F24F 5/0035 |
| 2004/0226956 A1 | 11/2004 | Brooks | |
| 2005/0120715 A1 * | 6/2005 | Labrador | F03G 7/00 |
| | | | 60/618 |
| 2011/0030401 A1 | 2/2011 | Kim | |
| 2011/0219800 A1 | 9/2011 | Lee | |
| 2012/0104002 A1 | 5/2012 | Jung et al. | |
| 2014/0109386 A1 * | 4/2014 | Matthews | B23P 13/00 |
| | | | 29/592 |
| 2014/0178513 A1 * | 6/2014 | Matthews | B29C 48/475 |
| | | | 425/6 |
| 2014/0375200 A1 | 12/2014 | Kim | |
| 2015/0030800 A1 | 1/2015 | Jung et al. | |
| 2018/0224195 A1 | 8/2018 | Jung et al. | |
| 2018/0238610 A1 | 8/2018 | Jung et al. | |
| 2020/0033049 A1 | 1/2020 | Dherde et al. | |

FOREIGN PATENT DOCUMENTS

| | | |
|---|---|---|
| CN | 104040272 | 9/2014 |
| CN | 107850377 | 3/2018 |
| JP | 2001-056284 | 2/2001 |
| JP | 2004-190880 | 7/2004 |
| KR | 20-0125480 | 11/1998 |
| KR | 20-0158720 | 10/1999 |
| KR | 10-0343719 | 7/2002 |
| KR | 10-1143975 | 5/2012 |
| KR | 2012/087993 | 5/2012 |
| KR | 10-1316023 | 10/2013 |
| KR | 10-2015-0012712 | 2/2015 |
| KR | 10-2017-0016187 | 2/2017 |
| WO | WO 2017/023095 | 2/2017 |
| WO | WO 2018/111235 | 6/2018 |

OTHER PUBLICATIONS

International Search Report dated Oct. 8, 2019 issued in Application No. PCT/KR2019/007765.
European Search Report dated Feb. 17, 2022 issued in Application No. 19825425.2.

* cited by examiner

VACUUM ADIABATIC BODY AND REFRIGERATOR

CROSS-REFERENCE TO RELATED APPLICATIONS

This application is a U.S. National Stage Application under 35 U.S.C. § 371 of PCT Application No. PCT/KR2019/007765, filed Jun. 26, 2019, which claims priority to Korean Patent Application No. 10-2018-0074307, filed Jun. 27, 2018, whose entire disclosures are hereby incorporated by reference.

TECHNICAL FIELD

The present disclosure relates to a vacuum adiabatic body and a refrigerator.

BACKGROUND ART

A vacuum adiabatic body may suppress heat transfer by vacuumizing the interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

In order to increase the internal volume of a refrigerator, there is an attempt to apply a vacuum adiabatic body to the refrigerator.

Korean Patent No. 10-0343719 (Cited Document 1) of the present applicant discloses a method in which a vacuum adiabatic panel is prepared and then built in walls of a refrigerator, and the exterior of the vacuum adiabatic panel is finished with a separate molding such as Styrofoam. According to the method, additional foaming is not required, and the adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Cited Document 2). According to Reference Document 2, fabrication cost is increased, and a fabrication method is complicated.

As further another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US20040226956A1 (Cited Document 3). However, it is difficult to obtain a practical adiabatic effect by providing a wall of the refrigerator with sufficient vacuum. In detail, there are limitations in that it is difficult to prevent a heat transfer phenomenon at a contact portion between an outer case and an inner case having different temperatures, to maintain a stable vacuum state, and to prevent deformation of a case due to a negative pressure of the vacuum state. Due to these limitations, the technology disclosed in Reference Document 3 is limited to a cryogenic refrigerator, and does not provide a level of technology applicable to general households.

Alternatively, the present applicant has applied for Korean Patent Publication No. 10-2017-0016187 (Cited Document 4) that discloses a vacuum adiabatic body and a refrigerator. The present technology proposes a refrigerator in which both a main body and a door are provided with a vacuum adiabatic body.

In a case of manufacturing a refrigerator, a control line to control various components such as a sensor and a driving unit or drive to operate the refrigerator connects the inside and outside of the refrigerator to each other. For this, in the refrigerator manufactured according to the related art, an electric line or wire may be disposed in a foam wall. Since the foam wall completely fills a space between the electric lines, the refrigerator may operate without losing adiabatic efficiency.

However, when the refrigerator is manufactured using the vacuum adiabatic body like Cited Document 4, it is difficult to place the electric lines inside the vacuum adiabatic body because of the difficulty in maintaining and manufacturing the vacuum performance. When the electric lines are installed to pass through the vacuum adiabatic body, the adiabatic performance of the vacuum adiabatic body may be affected. Since the number of lines connected to the inside and outside of the refrigerator is about 40 for the operation of the refrigerator, the increase in a number of through-parts or openings of the vacuum adiabatic body or the increase in size of each of the through-parts decreases adiabatic efficiency. Furthermore, since the number of lines increases more and more due to the refinement of the size of the refrigerator, there is a great difficulty in installing the electric lines connecting the inside and outside of the refrigerator to which the vacuum adiabatic body is applied.

The inventor of the present disclosure has found that there is Korean Patent Registration No. 10-1316023 (Cited Document 5), titled line combination module and line structure using the same, which disclosures a feature in which the inside and outside of the refrigerator are connected to each other through power line communication, through the conduction of the repeated research. According to Cited Document 5, an AC power line communication method is used to supply alternating current by using two electric lines to various loads placed in the refrigerator and perform the power line communication using the two electric lines. As a result, only the two electric lines may pass through the foam wall.

According to Cited Document 5, the number of electric lines passing through a wall of the refrigerator may be reduced to two.

Despite this advantage, the technology disclosed in Cited Document 5 is difficult to apply to the refrigerator due to the following limitations. First, there is a limitation that a rectifying device accompanied with a switching operation has to be provided in the inside of the refrigerator to perform DC driving of the load, and the energy consumption efficiency of the refrigerator is significantly lowered due to the heat of the rectifying device. Second, to perform the power line communication, a high-frequency filter and an A/D converter to receive power line signals are required for each of the individual loads in the refrigerator, and a D/A inverter for transmitting power line signals is required, and thus, a large amount of energy is lost. Third, there is a limitation in that high-frequency components used in communication are likely to be lost due to a difference in level between a low-frequency and a high-frequency when the power line communication is performed. Fourth, since a microcomputer of the door, a main body substrate, and individual microcomputers having a large load carry out transmission and reception individually by using two AC lines, it takes a lot of time to write or perform a program, and there is a great possibility of interference between signals transmitted and received between the nodes. Fifth, there is a limitation in that repairing is impossible or very difficult if the substrate and the parts are placed inside the foam wall.

DISCLOSURE

Technical Problem

Embodiments provide a vacuum adiabatic body in which the number of electric lines connecting the inside and outside of the vacuum adiabatic body to each other to air-condition an internal space is minimized. A refrigerator may include such a vacuum adiabatic body.

Embodiments also provide a vacuum adiabatic body and a refrigerator having the same in which an amount of generated heat within a refrigerator is minimized, and power consumption for transmitting and receiving signals is minimized.

Embodiments also provide a vacuum adiabatic body and a refrigerator having the same in which an error does not occur in transmitting and receiving signals between a controller and a load.

Technical Solution

In one embodiment, a vacuum adiabatic body may include an alternating current line through which AC current flows as a driving source, a direct current line through which direct current flows as a driving source, and a signal line through which a control signal flows as electric lines configured to electrically connect the first space to the second space. Thus, the number of lines or wires passing through the vacuum adiabatic body may be reduced.

In another embodiment, a refrigerator may include a main body configured to provide an inner space in which storage goods are stored, a door configured to be opened so that an outer space selectively communicates with the inner space, a main controller provided in the external space, an auxiliary controller disposed in the internal space to control components within the internal space, a direct current line connected to the main controller and the auxiliary controller to supply DC power to the auxiliary controller, a signal line which is connected to the main controller and the auxiliary controller and through which a control signal flows, and an alternating current line configured to supply AC power to a heat generation unit or heat generator provided in the internal space. The number of electric lines passing through the vacuum adiabatic body may be significantly reduced while sufficiently performing a control of the refrigerator.

In further another embodiment, a refrigerator may include a main body configured to provide an internal space in which storage goods are stored, a door configured to be opened so that an external space selectively communicates with the internal space, a heat generation unit or generator provided in the internal space, a power control part provided in the external space, and six lines configured to connect the external space to the internal space so as to supply power. The minimum number of lines may pass through the vacuum adiabatic body so that the refrigerator stably operates, and adiabatic reliability of the vacuum adiabatic body may be improved.

A heat resistance unit or sheet that resists heat transfer between the plate members providing an outer wall of the vacuum adiabatic body may include a conductive resistance sheet that resists conduction of heat transferred along a wall of the vacuum space part and may further include a side frame coupled to the conductive resistance sheet.

Also, the heat resistance unit may include at least one radiation resistance sheet that is provided in a plate shape within the vacuum space part or may include a porous material that resists radiation heat transfer between the second plate member and the first plate member within the vacuum space part.

Advantageous Effects

According to the embodiments, the number of electric lines connecting the inside and outside of the vacuum adiabatic body may be optimized so that stable driving of the refrigerator is obtained while reducing the size of the through-part or opening and the number of through-parts of the vacuum adiabatic body.

According to the embodiments, the separate heat generation source in the space within the refrigerator may be removed to improve the energy efficiency of the refrigerator.

According to the embodiments, the stability of the transmission and reception of the signals between the controller and the load may be secured to prevent the refrigerator from being broken down.

According to the embodiments, since the commercial load driven by the direct current is applied to the refrigerator to which the vacuum adiabatic body is applied as it is, the manufacturing cost of the refrigerator to which the vacuum adiabatic body is applied may be reduced.

DESCRIPTION OF DRAWINGS

FIGS. 37 to 39 are views for comparing and explaining a configuration of control of the refrigerator, wherein FIG. 37 is a view of a case in which a plurality of lines, e.g., about 40 lines, are inserted into the refrigerator in the main controller according to the related art, FIG. 38 is a view of a case in which six lines pass through the pipeline, and FIG. 39 is a view of a case in which the six lines pass through a spacing part between the sealing frame and an outer surface of the main body.

MODE FOR INVENTION

Hereinafter, exemplary embodiments will be described with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present disclosure.

The drawings shown below may be displayed differently from the actual product, or exaggerated or simple or detailed parts may be deleted, but this is intended to facilitate understanding of the technical idea of the present disclosure. It should not be construed as limited. However, the figures will try to show the actual shape as much as possible.

The following embodiments may be applied to the description of another embodiment unless the other embodiment does not collide with each other, and some configurations of any one of the embodiments may be modified in a state in which only a specific portion is modified in another configuration may be applied.

In the following description, the vacuum pressure means any pressure state lower than the atmospheric pressure. In addition, the expression that a vacuum degree of A is higher than that of B means that a vacuum pressure of A is lower than that of B.

Figure 1:
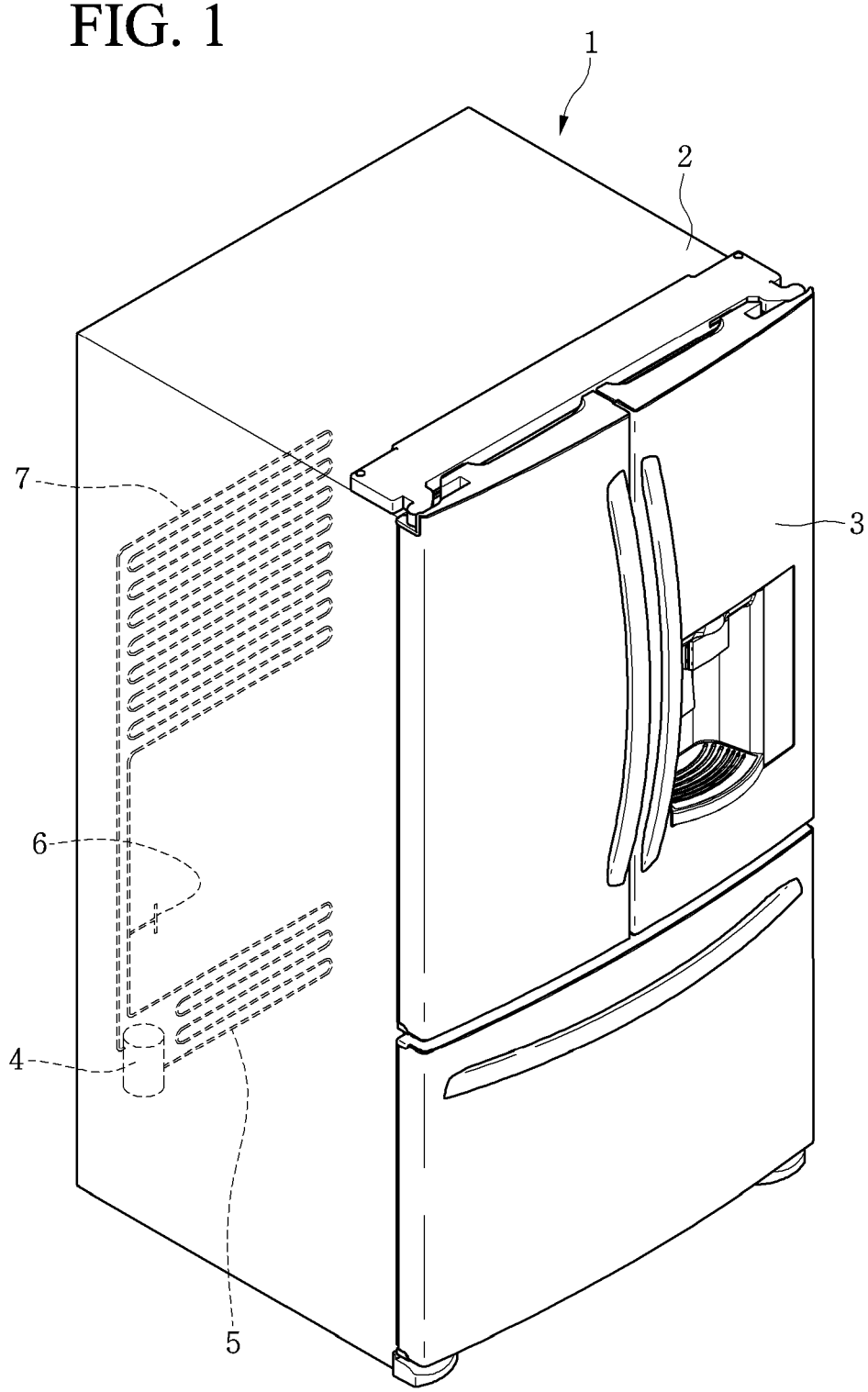
FIG. 1 is a perspective view of a refrigerator according to an embodiment.

FIG. 1 is a perspective view of a refrigerator according to an embodiment.

Referring to FIG. 1, the refrigerator 1 may include a main body 2 provided with a cavity 9 capable of storing storage goods and a door 3 provided to open or close the main body 2. The door 3 may be rotatably or slidably movably provided to open or close the cavity 9. The cavity 9 may provide at least one of a refrigerating compartment and a freezing compartment.

The cavity 9 may be supplied with parts or devices of a refrigeration or a freezing cycle in which cold air is supplied into the cavity 9. For example, the parts may include a compressor 4 to compress a refrigerant, a condenser 5 to condense the compressed refrigerant, an expander 6 to expand the condensed refrigerant, and an evaporator 7 to evaporate the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

Figure 2:
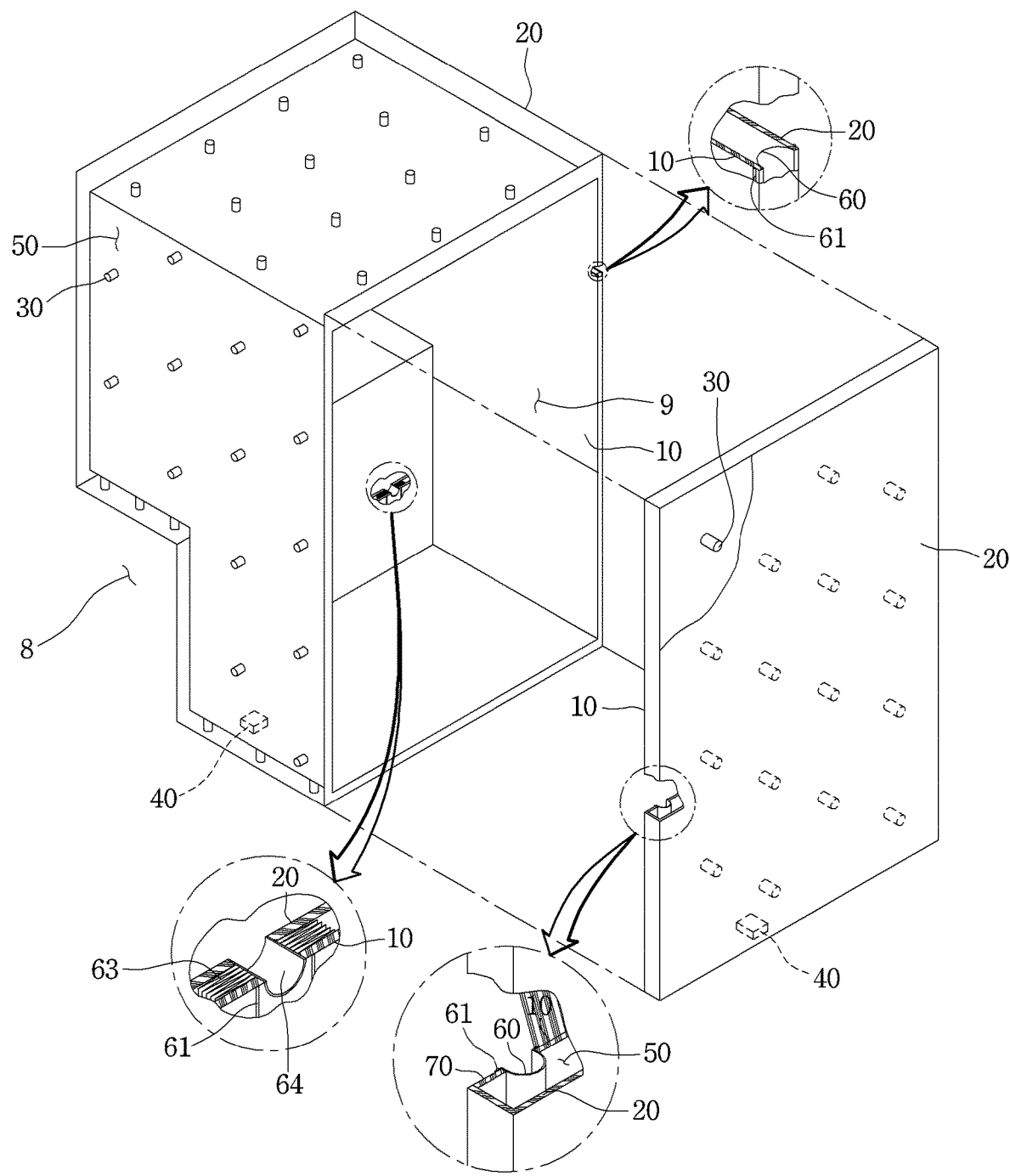
FIG. 2 is a view schematically showing a vacuum adiabatic body used in a main body and a door of the refrigerator.

FIG. 2 is a view schematically showing a vacuum adiabatic body used in the main body 2 and the door 3 of the refrigerator 1. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets 60 or 63 are provided are schematically illustrated for convenience of understanding.

Referring to FIG. 2, the vacuum adiabatic body may include a first plate member 10 to provide a wall of a low-temperature space or a first space, a second plate member 20 to provide a wall of a high-temperature space or a second space, and a vacuum space part or a third space 50 defined as a gap between the first and second plate members 10 and 20. Also, the vacuum adiabatic body includes the conductive resistance sheets 60 and 63 to prevent thermal or heat conduction between the first and second plate members 10 and 20. A sealing or welding part 61 may seal the conductive resistance sheets 60 and 63 to the first and second plate members 10 and 20 such that the vacuum space part 50 is in a sealed or vacuum state.

When the vacuum adiabatic body is applied to a refrigerator or a warming apparatus, the first plate member 10 providing a wall of an internal or inner space of the refrigerator 1 may be referred to as an inner case, and the second plate member 20 providing a wall of an outer or exterior space of the refrigerator may be referred to as an outer case.

A machine room 8 may include parts providing a refrigerating or a freezing cycle. The machine room 8 may be placed at a lower rear side of the main body-side vacuum adiabatic body, and an exhaust port 40 to form a vacuum state by exhausting air from the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are thermal or heat conduction between the first and second plate members 10 and 20, heat radiation between the first and second plate members 10 and 20, and gas conduction of the vacuum space part 50.

Hereinafter, a heat resistance unit or assembly provided to reduce adiabatic loss related to the factors of the heat transfer will be provided. The vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

The heat resistance unit may include a conductive resistance sheet 60 or 63 that resists conduction of heat transferred along a wall of a third space 50 and may further include a side frame coupled to the conductive resistance sheet. The conductive resistance sheet 60 or 63 and the side frame will be clarified by the following description.

Also, the heat resistance unit may include at least one radiation resistance sheet 32 that is provided in a plate shape within the third space 50 or may include a porous material that resists radiation heat transfer between the second plate member 20 and the first plate member 10 within the third space 50. The radiation resistance sheet 32 and the porous material will be clarified by the following description.

Figure 3A:
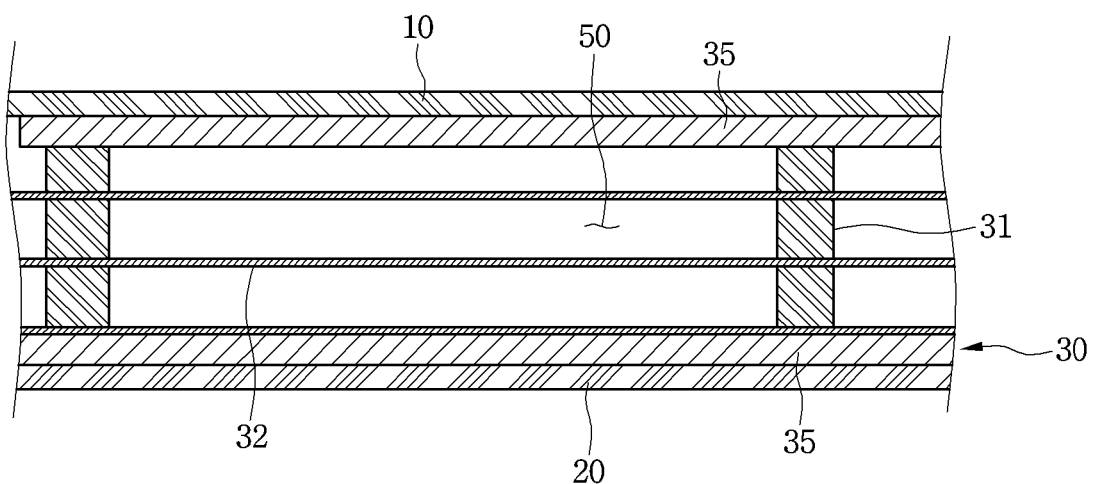
FIGS. 3A 3C are views illustrating various embodiments of an internal configuration of a vacuum space part.
Figure 3B:
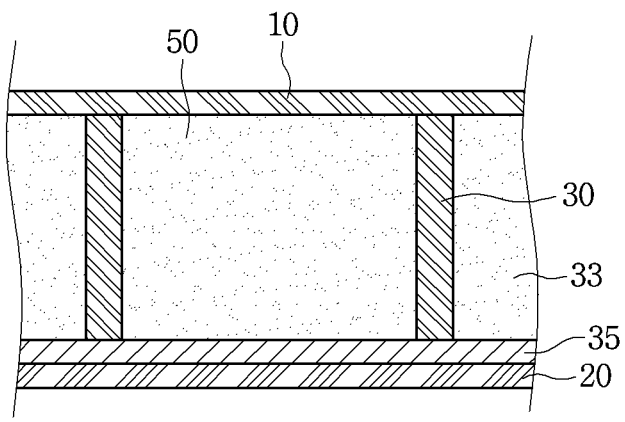

FIGS. 3A 3B are views illustrating various embodiments of an internal configuration of the vacuum space part or third space 50.

First, referring to FIG. 3A, the vacuum space part 50 may have a pressure different from that of each of the first and second spaces, preferably, a vacuum state, thereby reducing an adiabatic loss. The vacuum space part 50 may be provided at a temperature between the temperature of the first space and the temperature of the second space. Since the vacuum space part 50 is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which a distance between the plate members 10 and 20 is reduced. In this case, the adiabatic loss may be caused due to an increase in amount of heat radiation, caused by the contraction of the vacuum space part 50, and an increase in amount of thermal conduction, caused by contact between the plate members 10 and 20.

The supporting unit or support 30 may be provided to reduce deformation of the vacuum space part 50. The supporting unit 30 includes a bar 31. The bar 31 may extend in a substantially vertical direction with respect to the plate members 10 and 20 to support a distance between the first plate member 10 and the second plate member 20. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first or second plate members 10 or 20, thereby preventing deformation of the first and second plate members 10 and 20. In addition, based on the extension direction of the bars 31, a total sectional area of the support plate 35 is provided to be greater than that of the bars 31, so that heat transferred through the bars 31 may be diffused through the support plate 35.

The supporting unit 30 may be made of a resin selected from PC, glass fiber PC, low outgassing PC, PPS, and LCP to obtain high compressive strength, a low outgassing and water absorption rate, low thermal conductivity, high compressive strength at a high temperature, and superior processability.

A radiation resistance sheet 32 to reduce heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be used as the material of the radiation resistance sheet 32. In an embodiment, an aluminum foil having an emissivity of 0.02 may be used as the radiation resistance sheet 32. Also, since the transfer of radiation heat may not be sufficiently blocked using one radiation resistance sheet 32, at least two radiation resistance sheets 32 may be provided at a certain distance so as not to contact each other. Also, at least one radiation resistance sheet 32 may be provided in a state in which it contacts the inner surface of the first or second plate member 10 or 20.

Referring to FIG. 3B, the distance between the plate members 10 and 20 is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer.

In the present embodiment, the vacuum adiabatic body may be manufactured without the radiation resistance sheet 32.

Figure 3C:
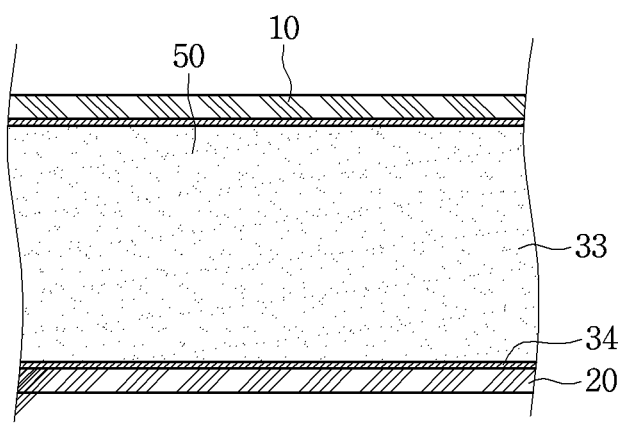

Referring to FIG. 3C, the supporting unit 30 to maintain the vacuum space part 50 may not be provided. A porous material 333 may be provided to be surrounded by a film 34 instead of the supporting unit 30. Here, the porous material 33 may be provided in a state of being compressed so that the gap of the vacuum space part 50 is maintained. The film 34 made of, for example, a PE material provided in a state in which a hole is punched in the film 34.

In the present embodiment, the vacuum adiabatic body may be manufactured without the supporting unit 30. That is to say, the porous material 33 may perform the function of the radiation resistance sheet 32 and the function of the supporting unit 30 together.

Figure 4A:
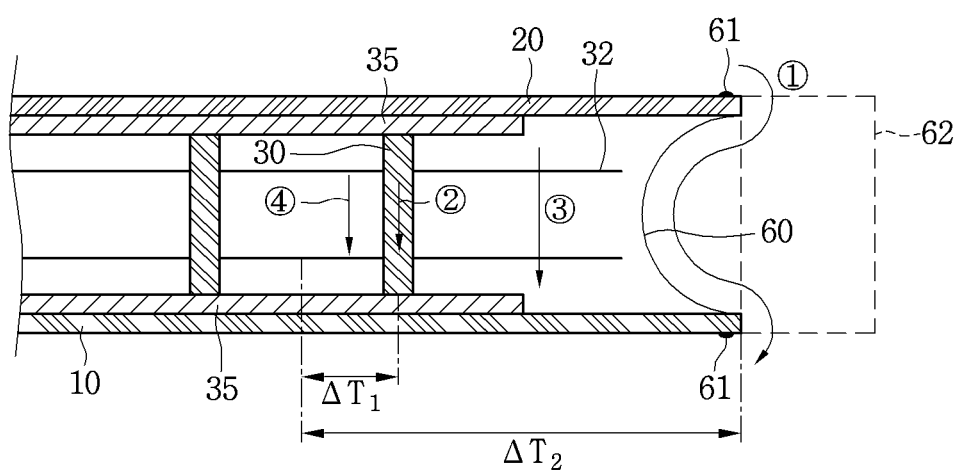
FIG. 4 is a view illustrating various embodiments of conductive resistance sheets and peripheral portions thereof.
Figure 4B:
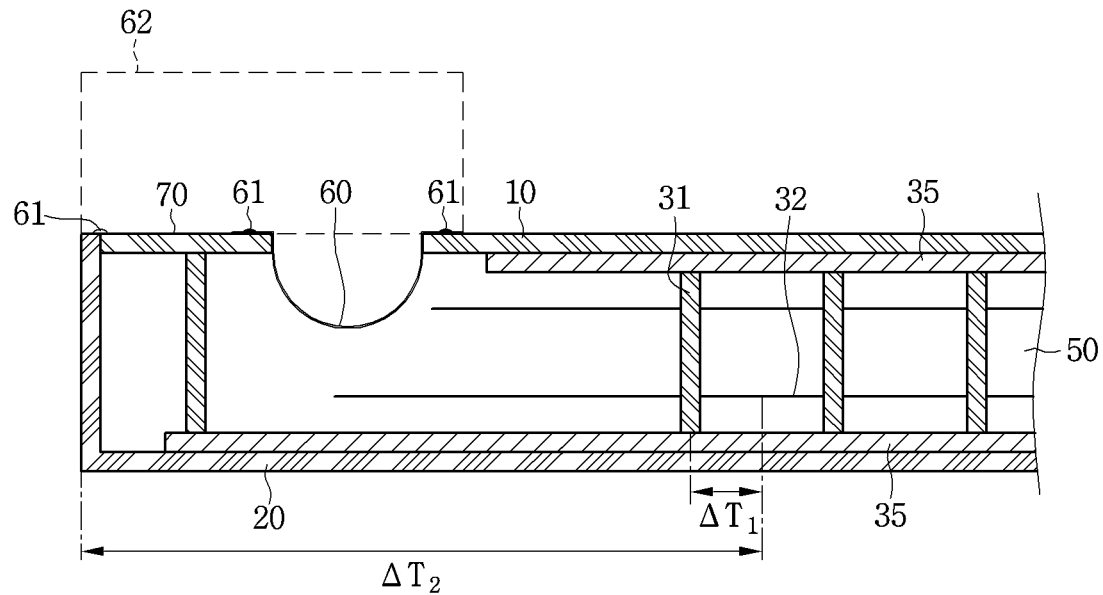
Figure 4C:
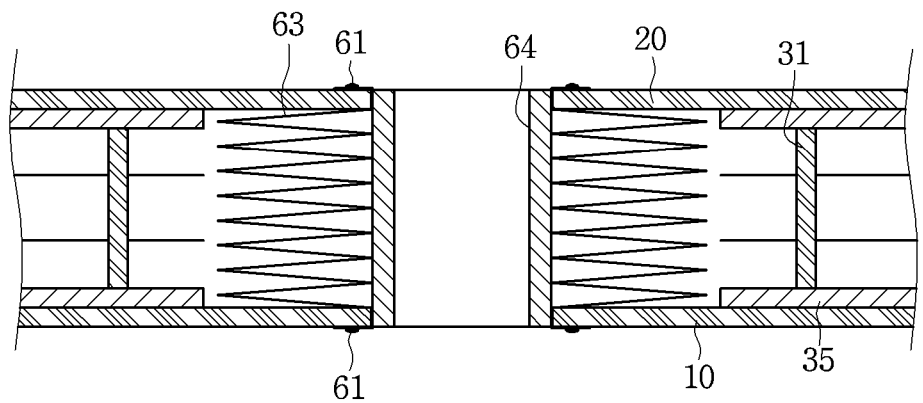

FIGS. 4A 4C are views illustrating various embodiments of conductive resistance sheets 60 or 63 and peripheral parts thereof. Structures of the conductive resistance sheets 60 or 63 are briefly illustrated in FIG. 2, but will be understood in detail with reference to the drawings.

First, a conductive resistance sheet 60 proposed in FIG. 4A may be applied to the main body-side vacuum adiabatic body. Specifically, the first and second plate members 10 and 20 may be sealed so as to vacuumize the interior of the vacuum adiabatic body. In this case, since the first and second plate members 10 and 20 have different temperatures from each other, heat transfer may occur between the first and second plate members 10 and 20. A conductive resistance sheet 60 is provided to prevent thermal conduction between two different kinds of plate members 10 and 20.

The conductive resistance sheet 60 may be provided with sealing or welding parts 61 at which both ends of the conductive resistance sheet 60 are sealed to define at least one portion of the wall for the third space or vacuum space part 50 and maintain the vacuum state. The conductive resistance sheet 60 may be provided as a thin foil in unit of micrometer so as to reduce the amount of heat conducted along the wall for the vacuum space part 50. The sealing parts 610 may be provided as welding parts, and the conductive resistance sheet 60 and the plate members 10 and 20 may be fused to each other. In order to cause a fusing action between the conductive resistance sheet 60 and the first and second plate members 10 and 20, the conductive resistance sheet 60 and the first and second plate members 10 and 20 may be made of the same material (e.g., a stainless material). The sealing parts 610 are not limited to the welding parts, and may be provided through a process such as cocking. The conductive resistance sheet 60 may be provided in a curved shape. Thus, a thermal conduction distance of the conductive resistance sheet 60 is provided longer than the linear distance of each plate member 10 and 20, so that the amount of thermal conduction may be further reduced.

A change in temperature occurs along the conductive resistance sheet 60. Therefore, in order to block heat transfer to the exterior of the conductive resistance sheet 60, a shielding part or cover 62 may be provided at the exterior of the conductive resistance sheet 60 such that an adiabatic action occurs. In other words, in the refrigerator 1, the second plate member 20 has a high temperature and the first plate member 10 has a low temperature. In addition, thermal conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 may not serve as a conductive resistor at the exposed portion.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body 2 and the door 3 are opened, the shielding part 62 may be provided as a porous material or a separate adiabatic structure.

A conductive resistance sheet 60 proposed in FIG. 4B may be applied to the door-side vacuum adiabatic body. In FIG. 4B, portions different from those of FIG. 4A are described in detail, and the same description is applied to portions identical to those of FIG. 4A. A side frame 70 is further provided at an outside of the conductive resistance sheet 60. A part or seal to seal between the door 3 and the main body 2, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part 50, i.e., a corner side portion of the vacuum space part 50. This is because, unlike the main body 2, a corner edge portion of the door 3 is exposed to the exterior. In more detail, if the conductive resistance sheet 60 is placed at the front end portion of the vacuum space part 50, the corner edge portion of the door 3 is exposed to the exterior, and hence there is a disadvantage in that a separate adiabatic part should be configured so as to thermally insulate the conductive resistance sheet 60.

A conductive resistance sheet 63 proposed in FIG. 4C may be installed in the pipeline 64 passing through the vacuum space part 50. In FIG. 4C, portions different from those of FIGS. 4A and 4b are described in detail, and the same description is applied to portions identical to those of FIGS. 4A and 4B. A conductive resistance sheet 63 having a similar shape as that of FIG. 4A, such as a wrinkled or zig-zag conductive resistance sheet 63, may be provided at a peripheral portion of the pipeline 64. Accordingly, a heat transfer path may be lengthened, and deformation caused by a pressure difference may be prevented. In addition, a separate shielding part may be provided to improve the adiabatic performance of the conductive resistance sheet.

A heat transfer path between the first and second plate members 10 and 20 will be described with reference back to FIG. 4A. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit 30 may be changed such that the first and second plate members 10 and 20 may endure a vacuum pressure without being deformed, the vacuum pressure may be changed, the distance between the first and second plate members 10 and 20 may be changed, and the length of the conductive resistance sheet 60 or 63 may be changed. The transfer heat may be changed depending on a difference in temperature between the spaces (the first and second spaces) respectively provided by the plate members 10 and 20. In the embodiment, a configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become the smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is the largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Equation 1.

$$eK_{solid\ conduction\ heat} > eK_{radiation\ transfer\ heat} > eK_{gas\ conduction\ heat} \quad \text{[Equation 1]}$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by k=QL/AΔT. Here, Q denotes a calorific value (W) and may be obtained using a calorific value of a heater. A denotes a sectional area (m²) of the vacuum adiabatic body, L denotes a thickness (m) of the vacuum adiabatic body, and ΔT denotes a temperature difference.

For the surface conduction heat, a conductive calorific value may be obtained through a temperature difference (ΔT) between an entrance and an exit of the conductive resistance sheet 60 or 63, a sectional area (A) of the conductive resistance sheet, a length (L) of the conductive resistance sheet 60 or 63, and a thermal conductivity (k) of the conductive resistance sheet 60 or 63 (the thermal conductivity of the conductive resistance sheet is a material property of a material and may be obtained in advance). For the supporter conduction heat, a conductive calorific value may be obtained through a temperature difference (ΔT) between an entrance and an exit of the supporting unit 30, a sectional area (A) of the supporting unit 30, a length (L) of the supporting unit 30, and a thermal conductivity (k) of the supporting unit 30. Here, the thermal conductivity of the supporting unit 30 is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat may be changed depending on various variables including a kind, an amount, and the like of the porous material.

According to an embodiment, a temperature difference $\Delta T_1$ between a geometric center formed by adjacent bars 31 and a point at which each of the bars 31 is located may be preferably provided to be less than 0.5° C. Also, a temperature difference $\Delta T_2$ between the geometric center formed by the adjacent bars 31 and an edge portion of the vacuum adiabatic body may be preferably provided to be less than 0.5° C. In the second plate member 20, a temperature difference between an average temperature of the second plate member 20 and a temperature at a point at which a heat transfer path passing through the conductive resistance sheet 60 or 63 meets the second plate member 20 may be the largest. For example, when the second space is a region hotter than the first space, the temperature at the point at which the heat transfer path passing through the conductive resistance sheet 60 or 63 meets the second plate member 20 becomes lowest. Similarly, when the second space is a region colder than the first space, the temperature at the point at which the heat transfer path passing through the conductive resistance sheet 60 or 63 meets the second plate member 20 becomes highest.

This means that the amount of heat transferred through other points except the surface conduction heat passing through the conductive resistance sheet 60 or 63 should be controlled, and the entire heat transfer amount satisfying the vacuum adiabatic body may be achieved only when the surface conduction heat occupies the largest heat transfer amount. To this end, a temperature variation of the conductive resistance sheet 60 or 63 may be controlled to be larger than that of the plate members 10 and 20.

Physical characteristics of the parts constituting the vacuum adiabatic body will be described. In the vacuum adiabatic body, a force by vacuum pressure is applied to all of the parts. Therefore, a material having a strength (N/m²) of a certain level may be preferably used.

Under such conditions, the plate members 10 and 20 and the side frame 70 may be made of a material having a sufficient strength with which they are not damaged by even vacuum pressure. For example, when the number of bars 31 is decreased so as to limit the support conduction heat, deformation of the plate members 10 and 20 may occur due to the vacuum pressure, which may bad influence on the external appearance of refrigerator. The radiation resistance sheet 32 may be made of a material that has a low emissivity and may be easily subjected to thin film processing. Also, the radiation resistance sheet 32 is to ensure a strength strong enough not to be deformed by an external impact. The supporting unit 30 is provided with a strength strong enough to support the force by the vacuum pressure and endure an external impact, and is to have machinability. The conductive resistance sheet 60 may be made of a material that has a thin plate shape and may endure the vacuum pressure.

In an embodiment, the plate members 10 and 20, the side frame 70, and the conductive resistance sheet 60 or 63 may be made of stainless materials having the same strength. The radiation resistance sheet 32 may be made of aluminum having a weaker strength that the stainless materials. The supporting unit 30 may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a high or predetermined strength, but the stiffness of the material may be low so as to increase heat resistance and minimize radiation heat as the conductive resistance sheet 60 or 63 is uniformly spread without any roughness when the vacuum pressure is applied. The radiation resistance sheet 32 requires a stiffness of a certain level so as not to contact another part due to deformation. Particularly, an edge portion of the radiation resistance sheet 32 may generate conduction heat due to drooping caused by the self-load of the radiation resistance sheet 32. Therefore, a stiffness of a certain level is required. The supporting unit 30 may require a stiffness strong enough to endure a compressive stress from the plate members 10 and 20 and an external impact.

In an embodiment, the plate members 10 and 20 and the side frame 70 may have the highest stiffness so as to prevent deformation caused by the vacuum pressure. The supporting unit 30, particularly, the bar 31 may have the second highest stiffness. The radiation resistance sheet 32 may have a stiffness that is lower than that of the supporting unit 30 but higher than that of the conductive resistance sheet 60 or 63. Lastly, the conductive resistance sheet 60 or 63 may be made of a material that is easily deformed by the vacuum pressure and has the lowest stiffness.

Even when the porous material 33 is filled in the vacuum space part 50, the conductive resistance sheet 60 or 63 may have the lowest stiffness, and the plate members 10 and 20 and the side frame 70 may have the highest stiffness.

Hereinafter, a vacuum pressure may be determined depending on an internal state of the vacuum adiabatic body. As already described above, a vacuum pressure is to be maintained inside the vacuum adiabatic body so as to reduce heat transfer. At this time, it will be easily expected that the vacuum pressure is maintained as low as possible so as to reduce the heat transfer.

The vacuum space part 50 may resist heat transfer by only the supporting unit 30. Here, a porous material 33 may be filled with the supporting unit 30 inside the vacuum space part 50 to resist to the heat transfer. The heat transfer to the porous material 33 may resist without applying the supporting unit 30.

The case where only the supporting unit 30 is applied will be described.

Figure 5:
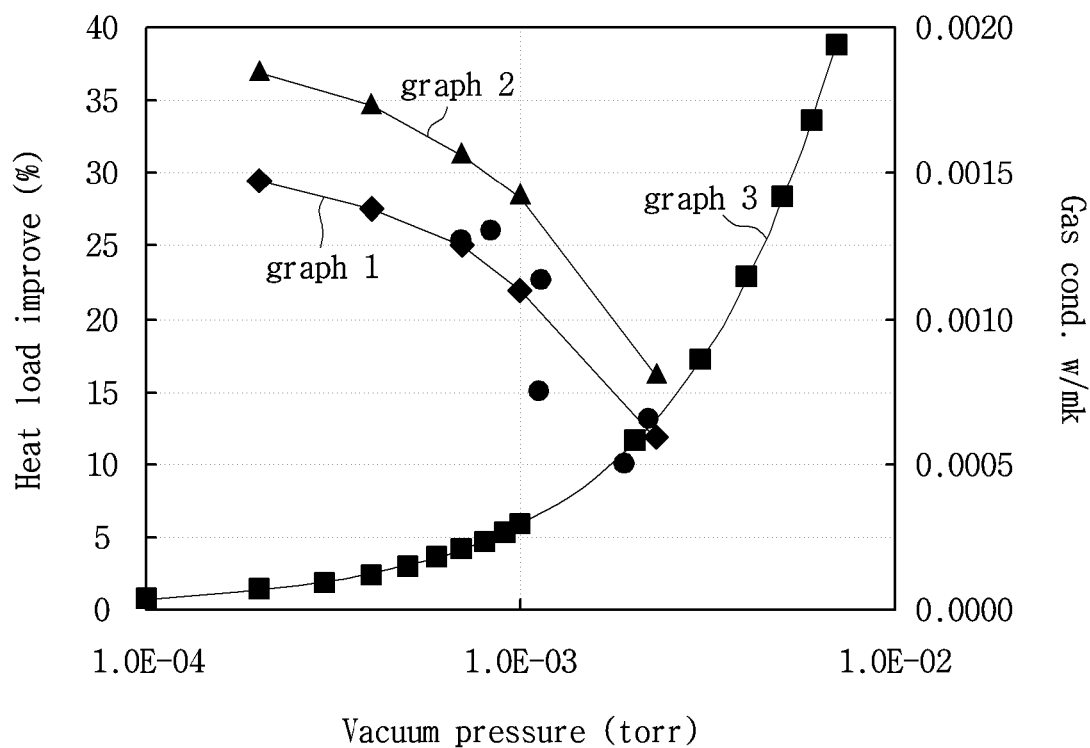
FIG. 5 is a graph illustrating a variation in adiabatic performance and a variation in gas conductivity according to a vacuum pressure by applying a simulation.

FIG. 5 illustrates graphs showing changes in adiabatic performance and changes in gas conductivity with respect to vacuum pressures by applying a simulation.

Referring to FIG. 5, it may be seen that, as the vacuum pressure is decreased, i.e., as the vacuum degree is increased, a heat load in the case of only the main body 2 (Graph 1) or in the case where the main body 2 and the door 3 are joined together (Graph 2) is decreased as compared with that in the case of the typical product formed by foaming polyurethane, thereby improving the adiabatic performance. However, it may be seen that the degree of improvement of the adiabatic performance is gradually lowered. Also, it may be seen that, as the vacuum pressure is decreased, the gas conductivity (Graph 3) is decreased. However, it may be seen that, although the vacuum pressure is decreased, the ratio at which the adiabatic performance and the gas conductivity are improved is gradually lowered. Therefore, the vacuum pressure is decreased as low as possible. However, it takes a long time to obtain excessive vacuum pressure, and much cost is consumed due to excessive use of a getter. In the embodiment, an optimal vacuum pressure is proposed from the above-described point of view.

Figure 6:
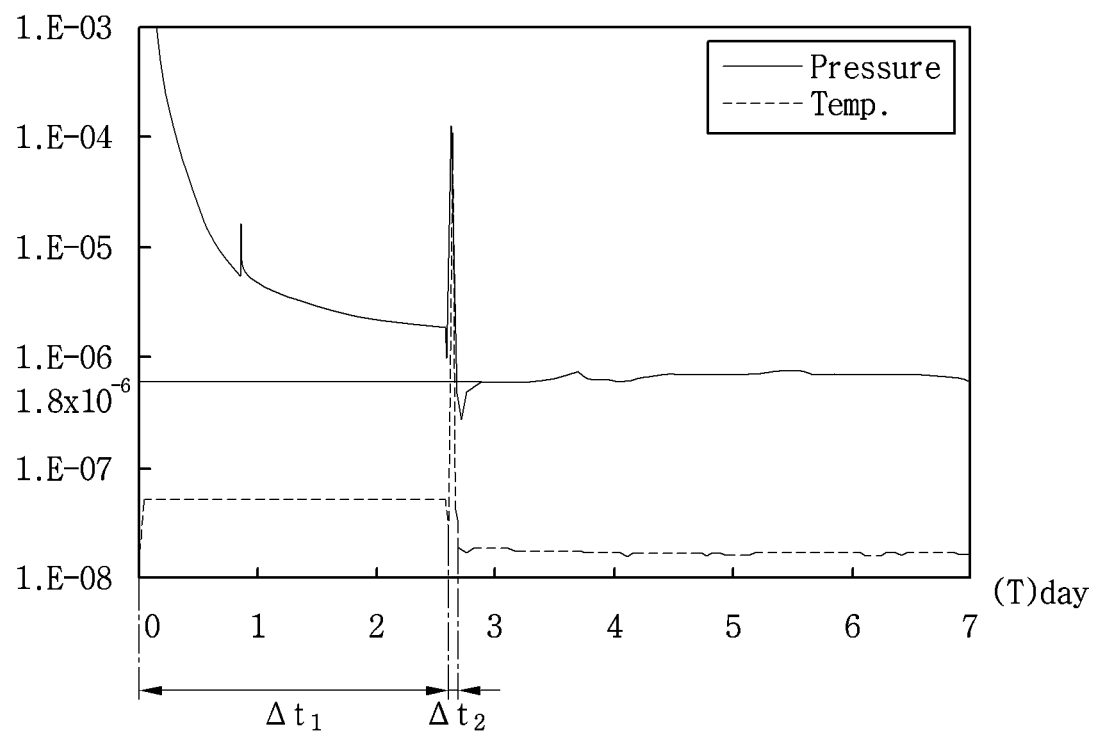
FIG. 6 is a graph illustrating results obtained by observing a time and a pressure in a process of exhausting the inside of the vacuum adiabatic body when a supporting unit is used.

FIG. 6 is a graph illustrating results obtained by observing a time and a pressure in a process of exhausting the inside of the vacuum adiabatic body when a supporting unit 30 is used.

Referring to FIG. 6, in order to create a vacuum state in the vacuum space part 50, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta T_1$). After that, the getter is activated by disconnecting the vacuum space part 50 from the vacuum pump and applying heat to the vacuum space part 50 ($\Delta T_2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting a minimum internal pressure of the vacuum space part 50 to $1.8 \times 10^{-6}$ Torr.

Figure 7:
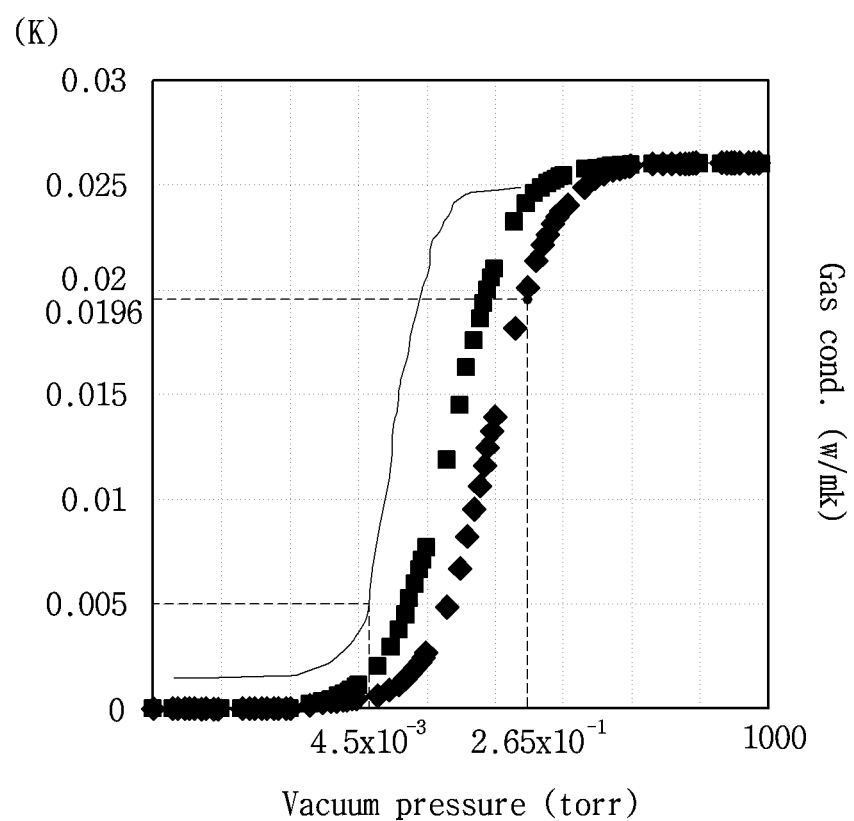
FIG. 7 is a graph illustrating results obtained by comparing a vacuum pressure with gas conductivity.

FIG. 7 is a graph obtained by comparing a vacuum pressure with gas conductivity.

Referring to FIG. 7, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member 10 or 20 adjacent thereto. When the radiation resistance sheet 32 does not exist inside vacuum space part 50, the gap is a distance between the first and second plate members 10 and 20.

It was seen that, since the size of the gap is small at a point corresponding to a typical effective heat transfer coefficient of 0.0196 W/mK, which is provided to a adiabatic material formed by foaming polyurethane, the vacuum pressure is $2.65 \times 10^{-1}$ Torr even when the size of the gap is 2.76 mm. Meanwhile, it was seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr may be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit 30 but provided with the porous material 33, the size of the gap ranges from a few micrometers to a few hundreds of micrometers. In this case, the amount of radiation heat transfer is small due to the porous material 33 even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit 30 and the porous material 33 are provided together in the vacuum space part 50, a vacuum pressure may be created and used, which may be a middle pressure between the vacuum pressure when only the supporting unit 30 is used and the vacuum pressure when only the porous material 33 is used. When only the porous material 33 is used, the lowest vacuum pressure may be used.

Hereinafter, an embodiment in which members, which pass through the inside and outside of the vacuum adiabatic body, such as a heat exchange pipeline 117, the electric line, the pipe, and the like are disposed in the internal space of the vacuum adiabatic body, i.e., the vacuum space part 50 will be described with reference to FIGS. 8 to 19.

In an embodiment, the heat exchange pipeline 117 is exemplified. In an embodiment, if the electric line rather than the heat exchange pipeline 117 is provided, the heat exchange pipeline 117 may be regarded as a line as it is in the drawings.

Figure 8:
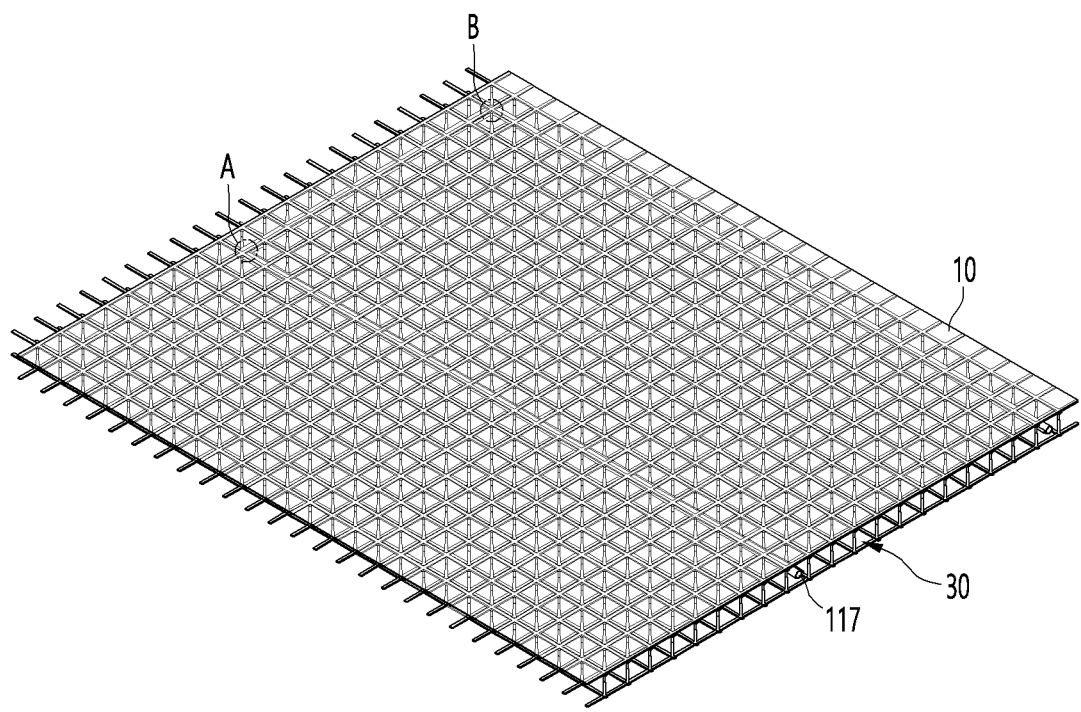
FIG. 8 is a partial cutaway view of the vacuum adiabatic body.
Figure 9:
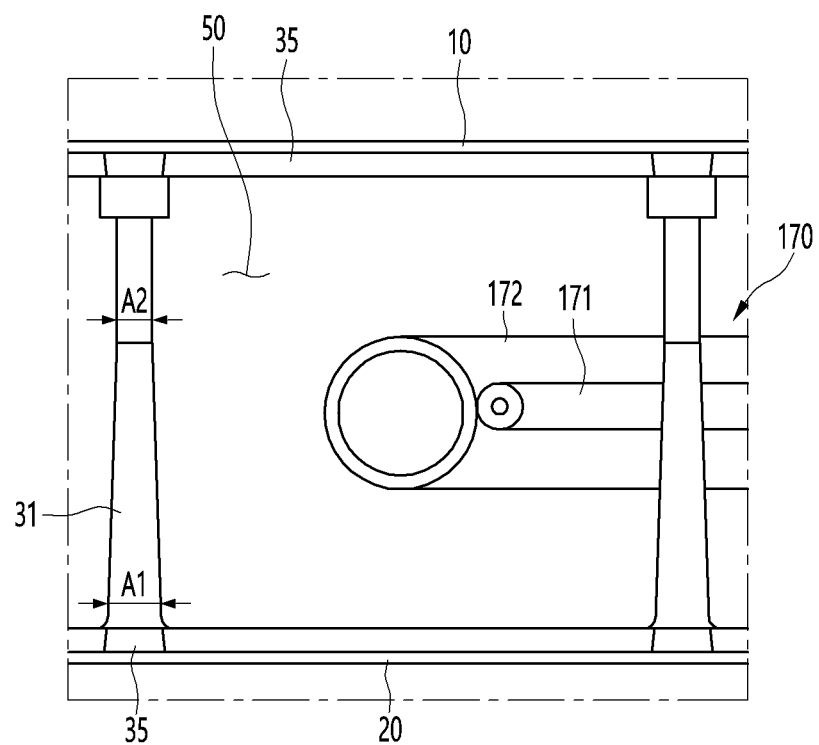
FIG. 9 is a view illustrating a state in which a heat exchange pipeline is provided in or through the vacuum space part.

Referring to FIGS. 8-9, the heat exchange pipeline 117 may have an inlet pipe 171 and an outlet pipe 172, which may be coupled to each other. The contact between the inlet pipe 171 and the outlet pipe 172 constituting the heat exchange pipeline 117 may be considered similar to the case where one or more pairs of electric lines and a pair of pipes contact each other. Similarly, when the outlet pipe 172 and the inlet pipe 171 constituting the heat exchange pipeline 117 are separated from each other and pass through the vacuum adiabatic body, it is understood that the pair of electric lines and the pair of pipes are separated from each other and pass through the vacuum adiabatic body.

When the inlet pipe 171 constituting the heat exchange pipeline is provided inside the outlet pipe 172, any one electric line may be provided in a configuration similar to a coaxial cable disposed inside the other electric line.

The heat exchange pipeline may be provided by bonding (e.g., welding) an inlet pipe 171 through which the refrigerant is introduced into an evaporator provided in the refrigerator to an outlet pipe 172 through which the refrigerant is discharged from the evaporator. The refrigerant flowing through the inlet pipe 171 and the outlet pipe 172 may be heat-exchanged with each other to improve efficiency of a refrigeration cycle.

A technique for supporting the position of the heat exchange pipeline 117 in the vacuum space part 50 will be described.

FIG. 8 is a partial cutaway view of the vacuum adiabatic body, and FIG. 9 is a view illustrating a state in which the heat exchange pipeline 117 is provided in the vacuum space part 50.

Referring to FIGS. 8 and 9, the supporting unit 30 is provided between the plate members 10 and 20. The supporting unit 30 includes a support panel or plate 35 contacting the plate members 10 or 20 and at least two or more bars 31 preferably, a plurality of bars 31 maintaining a gap between the plate members 10 and 20.

Each of the bars 31 may have a conical or tapered shape such that a lower portion may have a greater cross-sectional area A1 than a cross-sectional area A2 of an upper portion thereof in the drawing. As a result, high molding processability may be secured.

The heat exchange pipeline 117 may avoid contact with other members in the vacuum space part 50 as much as possible. When a pipeline made of a metal, for example, copper contacts the other member, heat exchange efficiency may be deteriorated due to thermal conduction, and thus, the adiabatic performance may not be realized. The bonding between the metals of the plate members 10 and 20 and the heat exchange pipeline 117 may cause a sharp or rapid heat loss or transfer.

The heat exchange pipeline 117 may be provided so as not to contact any member (e.g., the radiation resistance sheet 32, the bar 31, the support plate 35, and the first and second plates 10 and 20) at a gap between the bars 31 in the horizontal direction in a space between the first and second plate members 10 and 20 in the vertical direction. Thus, the occurrence of the heat loss due to the contact between the heat exchange pipeline 117 and the other members may be prevented.

The heat exchange pipeline 117 may be made of a material having relatively low rigidity, for example, copper. Thus, the heat exchange pipeline 117 may be weak against an external impact or force. When the heat exchange pipeline 117 is bent, any unintentional force in one direction may lead to deformation of the pipeline 117 to cause contact with another component (e.g., the bar 31) of the vacuum space part 50. This limitation may also be caused by an external impact. Thus, the heat exchange pipeline 117 may be supported by another guide member, sealing member, or spacing member.

To guide the heat exchange pipeline 117 so as to be spaced apart from other members, a spacing member or spacer is provided in the vacuum space part 50. The spacing member may be provided on a bent portion at the entire position of the heat exchange pipeline 117. The bent portion may correspond to each of areas A and B of FIG. 9.

As illustrated in FIGS. 8 and 9, the heat exchange pipeline 117 may be provided as two circumscribed pipelines—an inlet pipe 171 and an outlet pipe 172. In this case, complicated limitations such as branching of the two pipelines 171 and 172 at the inlet and outlet of the two pipelines 171 and 172 may occur.

To solve this limitation, inlet and outlet end portions of the heat exchange pipeline 117 may pass through one portion or opening of the first plate member 10 and one portion or opening of the second plate member 20. Hereinafter, as an embodiment, a case in which the heat exchange pipeline 117 is provided inside the vacuum adiabatic body, but the pipeline 117 is provided unilaterally will be described.

Figure 10:
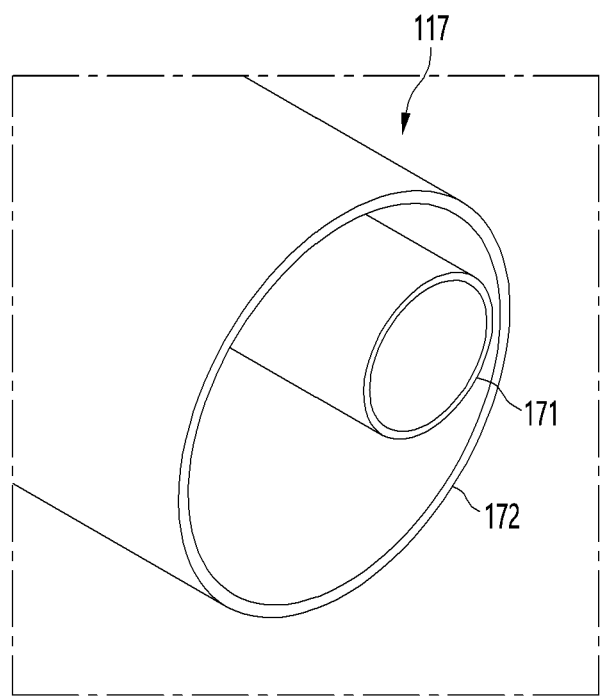
FIG. 10 is a partial cutaway view of the heat exchange pipeline according to an embodiment.

FIG. 10 is a partial cutaway view of the heat exchange pipeline according to an embodiment.

Referring to FIG. 10, in the heat exchange pipeline 117, an inlet pipe 171 having a smaller diameter may be provided in the outlet pipe 172 having a larger diameter. As described above, the refrigerant discharged after passing through the evaporator may flow through the outlet pipe 172, and the refrigerant to be introduced into the evaporator may flow through the inlet pipe 171.

A heat exchange area of the heat exchange pipeline 117, in which the heat exchange of the refrigerant is performed, may be inside of the outlet pipe 172. Thus, since it is unnecessary to perform a separate operation such as welding for promoting the heat exchange between the inlet pipe 171 and the outlet pipe 172, the manufacturing process may be convenient. Furthermore, since the gas generated in the welding part is generated in the beginning, the gas to be introduced into the vacuum space part 50 may be removed.

The heat exchange pipeline 117 according to an embodiment is in a state in which the inlet pipe 171 and the outlet pipe 172 are not branched or separated from the through-part or opening of each of the plate members 10 and 20. That is, a single pipeline 117 may pass through the plate members 10 and 20. Thus, since a separate or additional branch of the pipeline 117 in the through-part is unnecessary, a bent portion to avoid interference with the bar 31 may not be provided, and the pressure loss of the refrigerant flowing through the pipeline 117 may be reduced.

Hereinafter, a portion at which the heat exchange pipeline 117 passes through each of the plate members 10 and 20 will be described in more detail.

Figure 11:
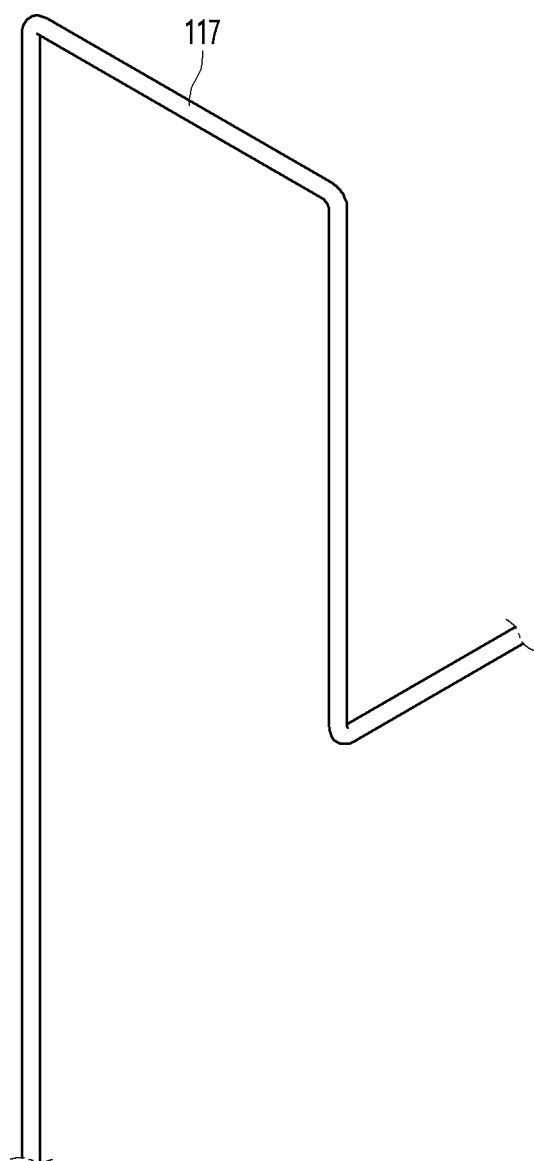
FIG. 11 is a view illustrating a state in which a heat exchange pipeline is provided in or through the vacuum space part.

FIG. 11 is a view illustrating a state in which the heat exchange pipeline 117 is provided in the vacuum space part 50.

Referring to FIG. 11, the heat exchange pipeline 117 is provided in the inner space of the vacuum space part 50 provided at a rear surface of the refrigerator 1. The heat exchange pipeline 117 may pass through the first plate member 10 via a single through-part or opening and pass through the second plate member 20 via a single through-part or opening.

The heat exchange pipeline 117 may have a first portion passing through the second plate member 20 so as to be guided to a machine room 8 (FIG. 2) and a second portion passing through the first plate member 10 so as to be guided to the evaporator within the refrigerator. The heat exchange pipeline 117 may pass through each of the plate members 10 and 20 by the single through-part.

The first portion of the heat exchange pipeline 117 may be linearly withdrawn without being bent in the extension direction thereof. On the other hand, the second portion of the heat exchange pipeline 117 may be withdrawn at an angle of about 90 degrees toward the inside of the refrigerator.

Figure 12A:
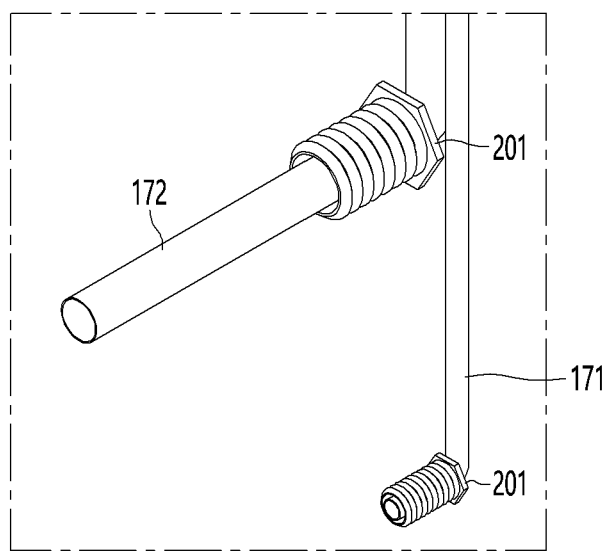
FIGS. 12A and 12B are views illustrating a portion of the heat exchange pipeline that is withdrawn to the inside of the refrigerator.
Figure 12B:
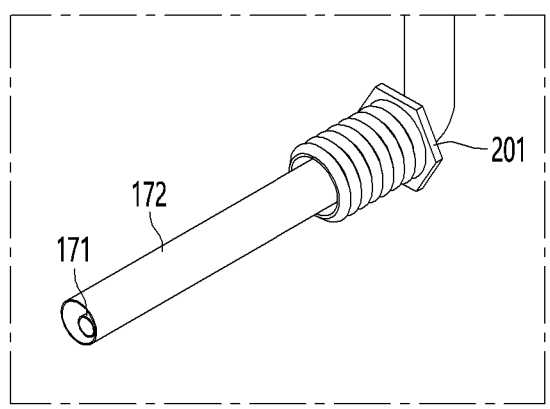
Figure 13A:
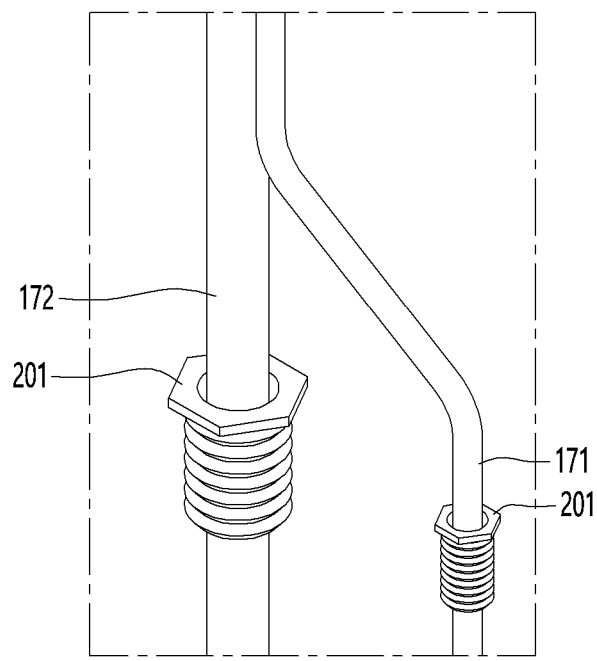
FIGS. 13A and 13B are views illustrating a portion of the heat exchange pipeline that is withdrawn to the outside of the refrigerator.

FIGS. 12A and 12B are views illustrating the second portion of the heat exchange pipeline 117 that is withdrawn to the inside of the refrigerator, and FIGS. 13A and 3B are views illustrating the first portion of the heat exchange pipeline that is withdrawn to the outside of the refrigerator, i.e., the machine room 8. FIGS. 12A-B and 13A-B illustrate an advantage according to a second embodiment in comparison to the technical according to the first embodiment, in which the inlet pipe 171 and the outlet pipe 172 are welded to each other.

Referring to FIG. 12A, each of the inlet pipe 171 and the outlet pipe 172, which are branched into two parts according to the first embodiment may pass through the first plate member 10 at a through-part or opening assembly 201. The pipelines 171 and 172 that individually pass through the two through-parts 201 are guided into the evaporator within the refrigerator. Thus, since the pipeline area in which the heat exchange occurs is reduced unless the branched inlet 171 and outlet pipes 172 are bonded to each other, there is a disadvantage in that the heat exchange pipeline provided in the vacuum space part 50 has to increase in length to realize sufficient heat exchange.

Referring to FIG. 12B, in this embodiment, the inlet pipe 171 may pass through the first plate member 10 as it is in the state of being provided in the outlet pipe 172 without being branched. Thus, the heat exchange pipeline 117 may be guided to the evaporator within the refrigerator by passing through a single through-part or opening assembly 201. Thus, since the inlet pipe 171 and the outlet pipe 172 are maintained in the bonded or coupled state, the heat exchange operation of the heat exchange pipeline 117 may be continuously performed even after being withdrawn to the inside of the refrigerator, and thus, the heat exchange pipeline 117 may decrease in length.

According to the comparison drawings of FIGS. 12A-B, the number of through-parts 201 through which the heat exchange pipeline 117 passes through the vacuum space part 50 may be reduced to reduce inconvenient work and the heat loss or transfer and also reduce destroying or interfering with a vacuum state of the vacuum space part 50. The welding part that is the contact part of the two pipelines 171 and 172 constituting the heat exchange pipeline 117 may not be exposed to the vacuum space part 50 to prevent the gas within the vacuum space part 50 from increasing, thereby improving the lifespan of the product. Particularly, an influence of the vacuum pressure due to the gas generated in the filler material 220 used for the welding may be reduced.

Referring to FIG. 13A, each of the inlet pipe 171 and the outlet pipe 172, which are branched into two parts according to the first embodiment may pass through the second plate member 20 via a through-part 201. The pipelines 171 and 172 that individually pass through the two through-parts 201 are guided into the machine room 8 outside the refrigerator. Thus, since the pipeline area in which the heat exchange occurs is reduced unless the branched inlet 171 and outlet pipes 172 are bonded to each other, there is a disadvantage in that the heat exchange pipeline provided in the vacuum space part 50 has to increase in length to realize sufficient heat exchange.

In addition, the inlet pipe 171 has to be branched so as to be separated from the inlet pipe 172 so that the inlet pipe 171 passes through the through-parts 201 different from each other. In this area, since the inlet pipe 171 is sharply bent to avoid the contact with the bar 31, the pipe 171 may be narrowed and cause the unexpected pressure loss.

Figure 13B:
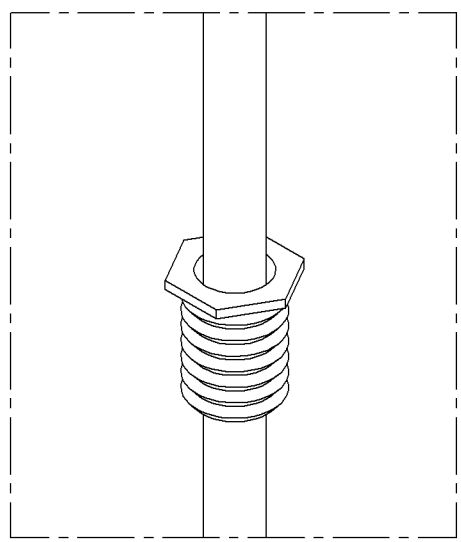

Referring to FIG. 13B, in this embodiment, the inlet pipe 171 may pass through the second plate member 20 as it is in the state of being provided in the outlet pipe 172 without being branched. Thus, the heat exchange pipeline 117 may be guided to the machine room 8 outside the refrigerator by passing through the single through-part 201. Thus, since the inlet pipe 171 and the outlet pipe 172 are maintained in the state of being bonded to each other, the heat exchange operation of the heat exchange pipeline 117 may be continuously performed even after being withdrawn to the outside of the refrigerator, and thus, the heat exchange pipeline 117 may decrease in length.

According to the comparison drawings of FIG. 13A-B, the number of through-parts 201 through which the heat exchange pipeline 117 passes through the vacuum space part 50 may be reduced to reduce inconvenient work, heat loss or transfer may be reduced, and a possibility of ruining a vacuum state of the vacuum space part 50 may be reduced. Also, the welding part that is the contact part of the inlet pipe 171 and the outlet pipe 172 may not be exposed to the vacuum space part 50 to prevent the gas within the vacuum space part 50 from increasing, thereby improving the lifespan of the product. Also, since the single pipe body, i.e., the inlet and outlet pipes 171 and 172 are directly withdrawn to the outside without the inlet pipe 171 and the outlet pipe 172 being branched from each other, the pressure loss of the refrigerant flowing through the inlet pipe 171 may be reduced.

Figure 14:
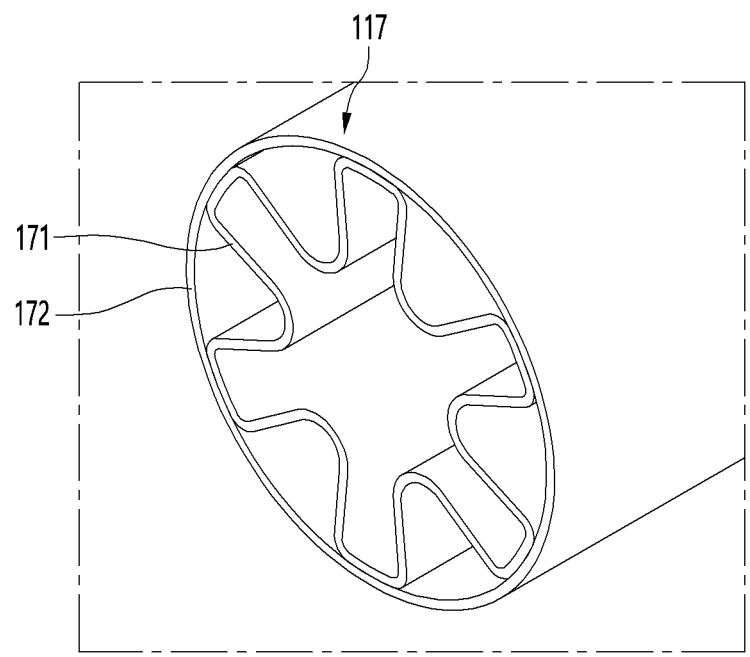
FIG. 14 is a cross-sectional view of a heat exchange pipeline according to another embodiment.

FIG. 14 is a cross-sectional view of a heat exchange pipeline according to another embodiment.

Referring to FIG. 14, an inlet pipe 171 provided in an inner space of an outlet pipe 172 may be wrinkled or have a wrinkled or ridged cross-sectional area shape. The wrinkled inlet pipe 171 may be heat-exchanged with the refrigerant within the inlet pipe 172 on a larger area. Thus, higher heat exchange efficiency may be obtained through the heat exchange pipeline 117 having the larger area.

The inlet pipe 172 and a through-part 201 may be coupled to each other in a heterogeneous welding manner or a gasket coupling manner. The heterogeneous welding manner may have an advantage in that a contact surface may be completely or better sealed by the welding. However, the inlet pipe 172 is made of copper, and each of plate members 10 and 20 is made of stainless steel. Thus, since the different materials are bonded to each other through the welding, it may be difficult to perform the welding, and stability after the welding may be deteriorated.

Further another embodiment in which the above-described limitation of the heterogeneous welding is solved, and the above-described advantage of the heat exchange pipeline is realized as it is will be described below.

Figure 15:
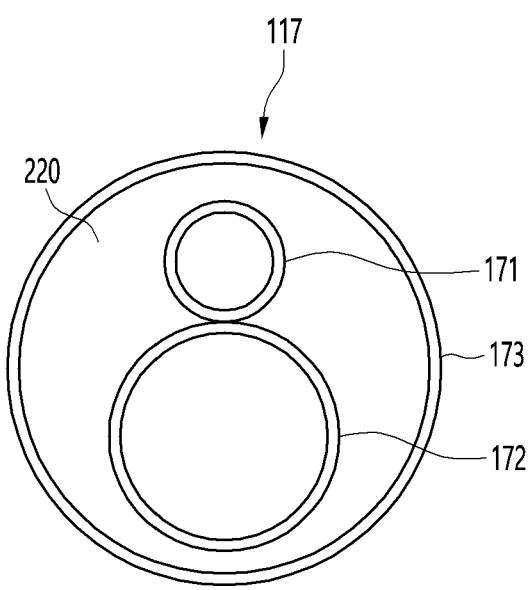
FIG. 15 is a cross-sectional view of a heat exchange pipeline according to further another embodiment.

FIG. 15 is a cross-sectional view of a heat exchange pipeline according to further another embodiment.

Referring to FIG. 15, in a heat exchange pipeline 117 according to this embodiment, an inlet pipe 171 and an outlet pipe 172 contact each other in a manner such as welding. The inlet pipe 171 may be adjacent to, rather than inside of, the outlet pipe 172. Thus, the inlet pipe 171 and the outlet pipe 172 may be smoothly heat-exchanged with each other. The inlet pipe 171 and the outlet pipe 172 may be accommodated in a sealing member or material 173 in the state of being bonded or coupled to each other. The sealing member 173 may have a predetermined strength and be made of stainless steel that is the same material as each of the plate members 10 and 20.

The sealing member 173 may be coupled to each of the plate members 10 and 20 in a homogeneous welding manner. As described above, since the metals made of the same material are bonded to each other through the welding, the bonding strength of the two members may be improved because the metals made of the same material are bonded to each other through the welding. Thus, the manufacturing work may be convenient, the coupling of the heat exchange pipeline, and reliability in sealing between the plate members may be improved.

A filler or spacer 220 is filled into the sealing member 173. The filler 220 may be filled into a spacing part between an outer surface of each of the inlet pipe 171 and the outlet pipe 172 and an inner surface of the sealing member 173. The filler 220 may include porous materials such as foamed polyurethane, glass fiber, etc. The outer surface of each of the inlet pipe 171 and the outlet pipe 172 may not directly contact the inner surface of the sealing member 173 by the filler 220. In this case, the heat exchange loss that is dissipated to the outside, particularly, the sealing member 173 itself may be reduced.

The filler 220 may not be provided as a separate material but may alternatively be provided by heat insulation using air or vacuum.

The insulation effect through the vacuum insulation and the air insulation may be less than that in the foregoing embodiment in which the filler 220 is separately provided. Also, it may be difficult to fix the positions of the inlet pipe 171 and the outlet 172 pipe.

According to this embodiment, like the embodiment described with reference to FIG. 9, the number of through-parts through which the pipeline 117 passes through the vacuum space part 50 may be reduced to reduce the inconvenient work and the heat loss by half, thereby reducing a possibility of ruining a vacuum state of the vacuum space part. Also, the welding part that is a contact part of two pipelines 171 and 172 constituting the heat exchange pipeline 117 may not be exposed to the vacuum space part 50 to prevent an amount of gas within the vacuum space part 50 from increasing. Also, since it is unnecessary to branch the inlet and outlet pipes 171 and 172 so as to pass through separate through-parts, a pressure loss of the refrigerant may be reduced.

According to this embodiment, since the heat exchange pipeline 117 and the plate members 10 and 20 are bonded to each other through the homogeneous welding when the heat exchange pipeline 117 and the plate members 10 and 20 are coupled to each other, the work may be convenient, and the reliability of the coupling and the sealing maintenance may be improved.

In this embodiment, since the inlet pipe 171 and the outlet pipe 172 are sealed inside the sealing member 173, the entire bending process of the heat exchange pipeline 117 may be difficult. For example, when the inlet pipe 171 and the outlet pipe 172 are provided inside and outside a curvature center of the bent portion at the bent portion of the heat exchange pipeline 117 within the vacuum space part 50, i.e., when the curvature centers of the inlet pipe 171 and the outlet pipe 172 are the same, but the curvature radii are different from each other, larger stress may be applied to the pipeline 117 or sealing member 173 provided outside the inlet pipe 171 and the outlet pipe 172.

In this case, the larger stress applied to the pipeline provided outside the inlet pipe 171 and the outlet pipe 172 may cause damage of the corresponding pipeline and damage of the welded portion. This limitation may be more pronounced due to the different diameters of the inlet pipe 171 and the outlet pipe 172, which are suitable for the flow of the refrigerant.

In this embodiment, to solve the above limitation occurring by the curvature radii of the different pipelines, a relative arrangement relationship between the inlet pipe 171 and the outlet pipe 172 may be provided inside the sealing member 173. The arrangement relationship between the inlet pipe 171 and the outlet pipe 172 will be described in more detail by changing the drawing.

Figure 16:
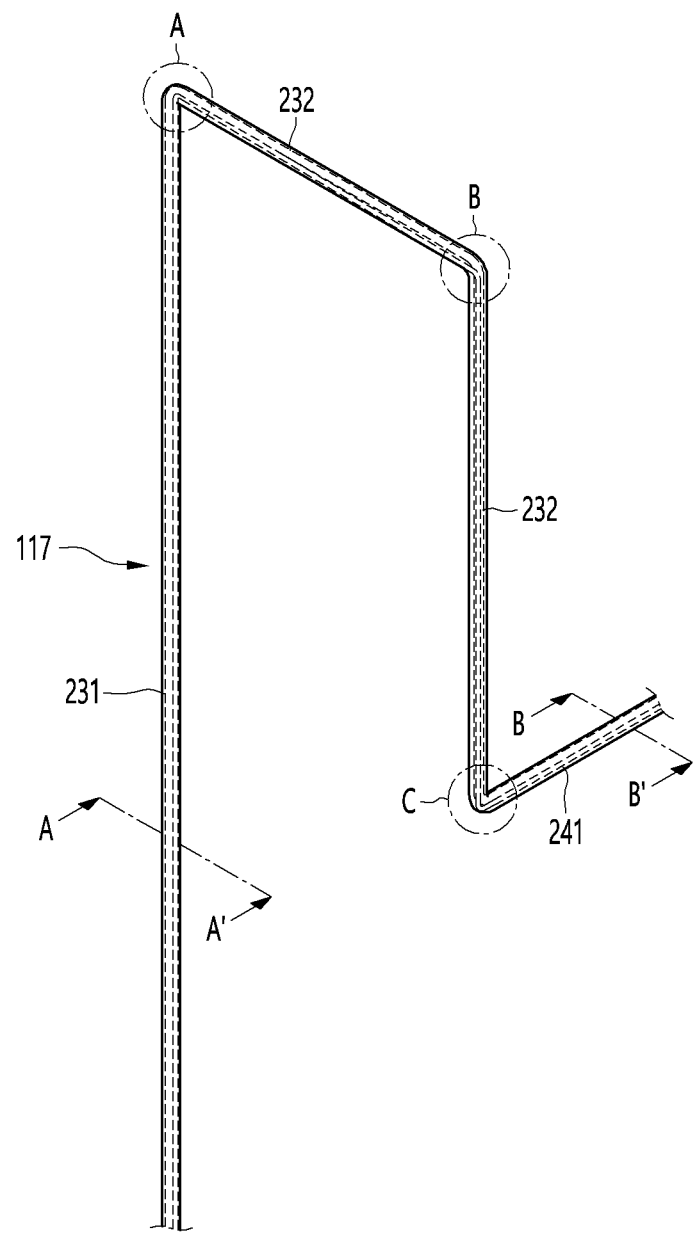
FIG. 16 is a view of a heat exchange pipeline according to further another embodiment.

FIG. 16 is a view of a heat exchange pipeline according to further another embodiment.

Referring to FIG. 16, an overall extension direction of a heat exchange pipeline 117 is similar to that of FIG. 11.

The heat exchange pipeline 117 may pass through a first plate member 10 via a single through-part and pass through a second plate member 20 via the single through-part.

The portion passing through the second plate member 20 may be linearly withdrawn without being bent in a direction in which the heat exchange pipeline 117 extends. The portion passing through the first plate member 10 may be withdrawn at an angle of about 90 degrees in a direction in which the heat exchange pipeline 117 is directed to the inside of the refrigerator.

As described above, according to the extension direction of the heat exchange pipeline 117, the heat exchange pipeline 117 may have a three-dimensional extension direction within a vacuum space part 50. In detail, three extension directions or portions 231, 232, and 233 may be defined within the same plane that is the same as the extension direction of a plane by which the vacuum space part 50 is provided. A fourth extension direction or portion 241 extending from the third extension direction 233 to the inside of the refrigerator, i.e., the direction passing through the first plate member 10 extends in a direction crossing or perpendicular to the plane but does not extend to the inside of the two-dimensional plane by which the vacuum space part 50 is provided. The fourth extension direction 241 may not be provided on the same plane of the first, second, and third extension directions 231, 232, and 233.

To prevent the inlet pipe 171 and the outlet pipe 172 from being damaged in the extension direction of the heat exchange pipeline 117, the inlet pipe 171 and the outlet pipe 172 may have the same curvature radius at a bending part or portion of the heat exchange pipeline 117. In FIG. 16, the bending parts are expressed by reference symbols A, B, C, respectively.

The bending parts A, B, and C will be described in more detail with reference to FIGS. 17 and 18.

Figure 17:
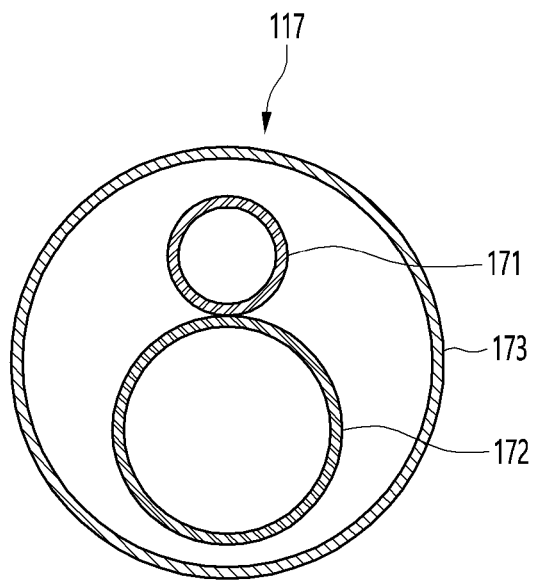
FIG. 17 is a cross-sectional view taken along line A-A' of FIG. 16.
Figure 18:
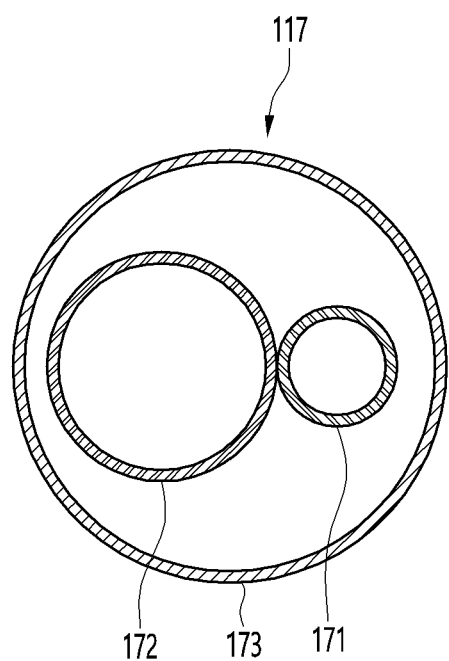
FIG. 18 is a cross-sectional view taken along line B-B' of FIG. 16.

FIG. 17 is a cross-sectional view taken along line A-A' of FIG. 16, and FIG. 18 is a cross-sectional view taken along line B-B' of FIG. 16.

Referring to FIGS. 16 and 17, the inlet pipe 171 and the outlet pipe 172 may be vertically provided in the sealing member 173. This arrangement may be maintained until passing through the bending parts A, B, and C. The bending may occur at least at right sides with respect to FIG. 17.

According to the arrangement of the inlet pipe 171 and the outlet pipe 172, since the inlet pipe 171 and the outlet pipe 172 have the same curvature radius at the bending parts A, B, and C, the damage of the bending parts A, B, C at each of the pipelines 171 and 172 and the bonded portions of the pipelines 171 and 172 may be prevented.

However, when the arrangement of the pipelines of FIG. 17 is maintained up to the bending part C, the curvature radii of the inlet pipe 171 and the outlet pipe 172 may be different from each other. That is to say, one of the pipelines, which is provided at a far side with respect to the curvature radius of the bending part C is bent at a large curvature radius. One of the pipelines, which is provided at a close side with respect to the curvature radius is bent at a small curvature radius. Thus, the pipeline itself or the bonded portion of the pipeline may be damaged.

Referring to FIGS. 16 and 18, the inlet pipe 171 and the outlet pipe 172 are provided in a horizontal direction, respectively. The arrangement of the pipelines 171 and 172 may be understood as being previously completed before reaching the bending part C. That is to say, the arrangement of the pipelines 171 and 172 may rotate at an angle of about 90 degrees before reaching the bending part C from the bending part B. For example, the inlet pipe 171 may be provided to rotate at an angle of about 90 degrees in a clockwise direction as illustrated in FIG. 18.

When the pipelines are horizontally provided as illustrated in FIG. 18, even though the heat exchange pipeline 117 is bent from the third direction 233 to the fourth direction 241, the curvature radii of the inlet pipe 171 and the outlet pipe 172 may be equally maintained. Thus, the curvature radii may be the same to prevent the pipelines 171 and 172 and the bonded portion of the pipelines 171 and 172 from being damaged even though the bending parts are provided.

Figure 19:
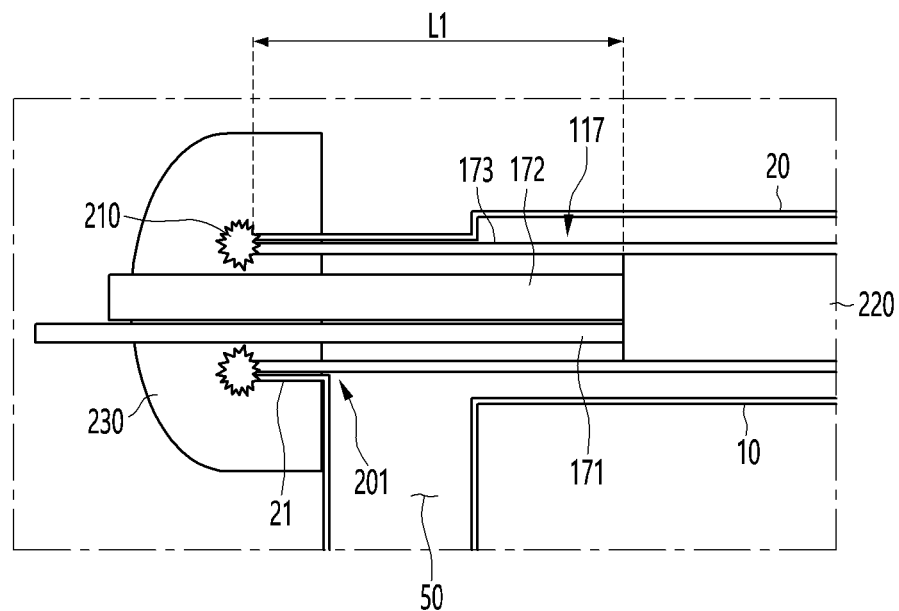
FIG. 19 is a cross-sectional view of a position at which the heat exchange pipeline passes through a second plate member.

FIG. 19 is a cross-sectional view of a position at which the heat exchange pipeline passes through the second plate member 20.

Referring to FIG. 19, the inlet pipe 171 and the outlet pipe 172 may be provided in the sealing member 173, and the filler 220 is filled into the sealing member 173 so that the inlet pipe 171 and the outlet pipe 172 do not contact with an inner surface of the sealing member 173. Alternatively, although it is possible to use vacuum and air instead of the filler 220, the filler 220 may be filled to prevent the heat transfer between the inlet pipe 171 and the outlet pipe 172, prevent cold air from leaking, and block vibration and noise propagated through the pipeline 117.

The through-part 201 will be described.

The second plate member 20 and the sealing member 173 may be welded to each other. In detail, an inner surface of the penetrated portion of the second plate member 20 and an outer surface of the sealing member 173, which is withdrawn to the outside of the refrigerator by passing through the second plate member 20, may be welded to each other. In this case, since the second plate member 20 and the sealing member 173 are made of the same material such as stainless steel and thus welded to each other in a homogeneous welding manner, welding reliability and lifespan may be improved. In the drawing, the reference numeral 210 represents a homogeneous welding part.

Heat may be generated from the homogeneous welding part 210. The heat may be conducted along the sealing member 173 to burn the filler 220. To solve this limitation, a predetermined width L1 may be provided between an end portion at which the filler 220 is provided and the homogeneous welding part 210. The width may have a length of about 5 cm. Thus, when the welding is performed, the burning of the filler 220 due to the heat transfer may be prevented.

To improve contact reliability of the welding part 210, a protrusion end part or portion 21 protruding from the second plate member 20 may be provided with a predetermined length. To provide the protrusion end portion 21, the shape of the second plate member 20 may be deformed in width or thickness. Although a protrusion end portion 21 is not necessarily provided for providing the through-part 201, the protrusion end portion 21 may be provided for convenience of an operation and to improve the vacuum performance so that the welding part is not exposed to the third space.

After the homogeneous welding is performed, the homogeneous welding part 210 may be covered by a finishing member or cover 230. The finishing member 230 may not need to have a function such as the vacuum maintenance, and it may be only necessary to prevent moisture from being permeated. Thus, the finishing member 230 may be made of rubber or sealant that is resistant to the moisture.

The structure illustrated in FIG. 19 may be applied as a similar configuration even at the position in which the heat exchange pipeline 117 passes through the first plate member 10.

In the various embodiments described above, it is shown that the heat exchange pipeline 117 is placed inside the vacuum space part 50. On the other hand, in following embodiment, the heat exchange pipeline 117 may be provided outside the vacuum space part 50. The heat exchange pipeline 117 may not be provided in the narrow vacuum space part to prevent the heat exchange pipeline 117 from negatively impacting a vacuum state of the vacuum space part 50, and an effort to install the heat exchange pipeline 117 into the narrow vacuum space 50 part may be unnecessary.

In the following embodiments, the heat exchange pipeline 117 refers to a pipeline area on which an inlet pipe 171 and an outlet pipe 172 intensively contact each other to allow the refrigerant inside of each of the inlet and outlet pipes 171 and 172 to be heat-exchanged with each other. Although the heat exchange is performed in other areas for additional heat exchange within the range of engineering margins, it may be understood that an amount of heat exchange is relatively small. In some cases, it is understood that the heat exchange pipeline 117 is additionally provided elsewhere, but in the embodiment, it is understood that the pipeline 117 for the heat exchange is placed in a region that is called a heat exchange pipeline 117.

Hereinafter, an embodiment in which the heat exchange pipeline 117, an electric line, etc. pass through the wall of the vacuum adiabatic body, i.e., the vacuum space part 50 will be described.

In an embodiment, the heat exchange pipeline 117 is exemplified. In an embodiment, if the electric line rather than the heat exchange pipeline 117 is provided, the heat exchange pipeline 117 may be regarded as a line as it is in the drawings.

The contact between the inlet pipe 171 and the outlet pipe 172 constituting the heat exchange pipeline may be considered similar to the case where one or more pairs of electric lines and a pair of pipes contact each other. Similarly, when the outlet pipe 172 and the inlet pipe 171 constituting the heat exchange pipeline 117 are separated from each other and pass through the vacuum adiabatic body, it is understood that the pair of electric lines and the pair of pipes are separated from each other and pass through the vacuum adiabatic body.

When the inlet pipe 171 constituting the heat exchange pipeline 117 is provided inside the outlet pipe 172, any one electric line may be provided in a configuration similar to a coaxial cable provided inside another electric line.

Figure 20:
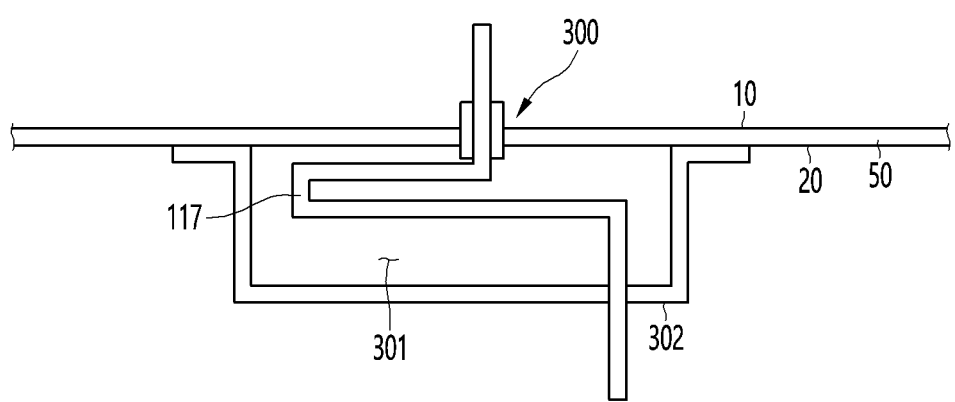
FIG. 20 is a view illustrating a configuration of an installation part of the heat exchange pipeline according to an embodiment.

FIG. 20 is a view illustrating a configuration of an installation part of the heat exchange pipeline according to another embodiment.

Referring to FIG. 20, the first plate member 10 and the second plate member 20 are provided, and a vacuum space part 50 is provided between the plate members 10 and 20. The first plate member 10 may be used as a low-temperature side wall of the refrigerator, and the second plate member 20 may be used as a high-temperature side wall of the refrigerator.

The heat exchange pipeline 117 may pass through a wall of the vacuum adiabatic body. That is to say, the heat exchange pipeline 117 may linearly pass through the first plate member 10, the vacuum space part 50, and the second plate member 20 and then be withdrawn from one space to the other space with respect to the vacuum adiabatic body. The plate members 10 and 20 through which the heat exchange pipeline passes may be the same point with respect to the vacuum adiabatic body. The heat exchange pipeline 117 may not be provided in the vacuum space part 50. When the vacuum adiabatic body is applied to the refrigerator, the vacuum adiabatic body may be withdrawn from the inside to the outside of the refrigerator.

A portion of the heat exchange pipeline 117, which passes through the wall of the vacuum adiabatic body, may be sealed by a through sealing part or sealing assembly 300. The heat exchange pipeline 117 may pass through the vacuum adiabatic body without vacuum breakage of the vacuum space part 50 and the adiabatic loss by the through sealing part 300. The through sealing part 300 may be called a portion at which the through-part or openings in the first and second plates 10 and 20 is sealed as one of the through-parts or openings provided in the wall of the vacuum adiabatic body. The through sealing part 300 may refer to a portion that is removed so that the vacuum adiabatic body passes therethrough. The through sealing part 300 will be described below in more detail with reference to other drawings.

The heat exchange pipeline 117 that is withdrawn to the outside may be configured so that the inlet pipe 171 and the outlet pipe 172 are heat-exchanged with each other in a predetermined space or fourth space that is partitioned from the outside by a pipeline adiabatic case 302. The heat exchange pipeline 117 may have a bent, rolled, or spiral shape so that the heat exchange pipeline 117 is intensively heat-exchanged within the pipeline adiabatic case 302.

The inside of the pipeline adiabatic case 302 may be have a pipeline adiabatic part or space 301 so that the inlet pipe 171 and the outlet pipe 172, which constitute the heat exchange pipeline 117, are heat-exchanged with each other to prevent the adiabatic loss due to the heat exchange with the outside from occurring. The pipeline adiabatic part 301 may alternatively be referred to as the fourth space. The pipeline adiabatic part 301 may perform an adiabatic function through vacuum, adiabatic foam, and air that is blocked from the outside. Alternatively, since the pipeline adiabatic case 302 may provide a fourth space partitioned from the first, second, and third spaces, the pipeline adiabatic case 302 may perform the adiabatic function through shielding.

The pipeline adiabatic case 302 may be installed on or at the second plate member 20, and the outer surface of the second plate member 20 may be provided as one wall of the pipeline adiabatic part 301. However, this embodiment is not limited thereto. For example, the pipeline adiabatic case 302 may be installed on or at a side of the first plate member 10, and the inner surface of the first plate member 10 may be provided as one wall of the pipeline adiabatic part 301. However, in this case, the space within the refrigerator may be narrowed.

At least the through sealing part 300 may be provided inside the pipeline adiabatic part 301 and the pipeline adiabatic case 302. That is to say, the through sealing part 300 may not be exposed to the outside and may be covered from the outside by the pipeline adiabatic part 301 and the pipeline adiabatic case 302.

The heat propagating along the heat exchange pipeline 117 may cause the adiabatic loss. For example, the vacuum breakage or destruction of a vacuum state of the vacuum space part 50 may not occur by the through sealing part 300, and an air flow to the outside of the refrigerator may be blocked to reduce the adiabatic loss. However, a case in which heat conducted to the inside of the refrigerator along the heat exchange pipeline 117 by using the first plate member 10 as a boundary is not sufficiently blocked may occur in designing a refrigeration system. In this case, the pipeline adiabatic part 301 and the pipeline adiabatic case 302 may be further installed at a side of the first plate member 10. In some cases, a small-sized adiabatic member rather than a large-sized having the pipeline adiabatic part 301 and the pipeline adiabatic case 302 may be implemented. It is to be understood that the adiabatic member is provided on both the plate members 10 and 20 in the following other embodiments.

However, the adiabatic loss affected in the inside of the refrigerator may be reduced by only the pipeline adiabatic part 301 and the pipeline adiabatic case 302, which are provided inside the second plate member 20, through sufficient examination of the refrigeration system.

According to this embodiment, the influence or effect exerted on the vacuum space part 50 by the heat exchange pipeline 117 may be reduced in the beginning, and the limitation in which the vacuum adiabatic body is not repaired later due to the sealing of the vacuum adiabatic body may be solved.

Hereinafter, the through sealing part 300 will be described according to an embodiment.

The through sealing part 300 may be installed at a point at which the heat exchange pipeline 117 passes through the vacuum adiabatic body and provided to prevent heat from being transferred to the inside and outside (the first and second spaces) that are partitioned by the vacuum adiabatic body.

Figure 21:
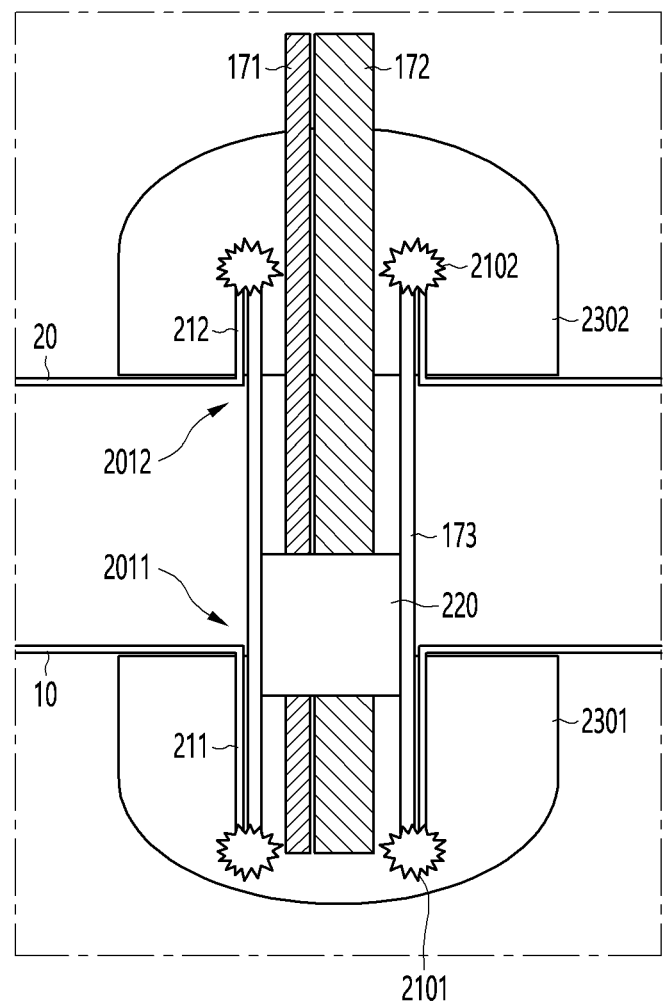
FIG. 21 is a cross-sectional view of a through sealing part or assembly according to an embodiment.

FIG. 21 is a cross-sectional view of the through sealing part 300 according to an embodiment.

Referring to FIG. 21, an inlet pipe 171, an outlet pipe 172, a filler 220, a through-part or opening assembly 201, a homogeneous welding part 210, a protrusion end portion 21, and a finishing member or cover 230, which are described in FIG. 19, are provided to perform the same or similar functions as described in FIG. 21. Thus, the description of FIG. 19 and other explanations of other portions of this specification may be similarly applied to the portions without the individual explanation.

A sealing action between the sealing member 173 and the first plate member 10 and a sealing action between the sealing member 173 and the second plate member 20 may have a mirror or symmetrical structure. Each of the through-parts 2011 and 2012, the homogeneous welding parts 2101 and 2102, the protrusion end parts 211 and 212, and the finishing members 2301 and 2302 may be respectively provided in the plate members 10 and 20, and the function of each member may be the same as previously described with reference to FIG. 19.

The sealing member 173 may be coupled to the through-parts 2011 and 2012, the homogeneous welding parts 2101 and 2102, the protrusion end parts 211 and 212, and the finishing members 2301 and 2302 together as one single member.

When adiabatic loads of the first member 10 and the second plate member 20 are different from each other, the through-parts 2011 and 2012, the homogeneous welding parts 2101 and 2102, the protrusion end parts 211 and 212, and the finishing members 2301 and 2302, which are provided in a pair, may be different in kind and number. However, this may also be interpreted as being included in the mirror structure. For example, the first finishing member 2301 provided on a side of the first plate member 10 that provides a wall at the inside of the refrigerator may have a larger adiabatic load than that of the second finishing member 2302. In this case, the size of the first finishing member 2301 may be larger, or the first finishing member 2301 may be provided in a structure in which two of the first finishing member 2301 are covered with each other.

The finishing members 2301 and 2302 may block heat transfer between the first space and the second space by the sealing member 173 connecting the first plate member 10 to the second plate member 20. Thus, the adiabatic performance between the first space and the second space may be improved. For this, the finishing members 2301 and 2302 may be provided so as to cover the adjacent portions of the through-parts 2011 and 2012, the sealing member 173, and the plate members 10 and 20 together.

The filler 220 may facilitate heat exchange between the inlet pipe 171 and the outlet pipe 172 and prevent heat exchange with the outside. Although the filler 220 is shown as being biased toward the first plate member 10 (or provided closer to the first plate member 10 than the second plate member 20) in the drawing, it may be provided in a gap part between the finishing members 2301 and 2302. In the drawing, the filler 220 may be provided parallel to or in line with the intermediate vacuum space part 50.

When explaining the configuration and operation of the through sealing part 173, the inlet pipe 171 and the outlet pipe 172 may pass through the wall of the vacuum adiabatic body when the inlet pipe 171 and the outlet pipe 172 are located inside the sealing member 173.

According to the through sealing part 300, the refrigerant pipe may pass through the pair of the plate members 10 and 20 while being sealed inside the sealing member 173 to connect the inside and the outside of the refrigerator. Thus, the number of welded points of the vacuum adiabatic body may be reduced to reduce the risk of vacuum leakage. Also, since the sealing member 173 and the plate members 10 and 20 are welded with the homogeneous material, possibility of a vacuum fracture due to a welding defect may be further reduced.

According to the through sealing part 300, since the heat exchange pipe 117 and the plate members 10 and 20 do not directly contact each other, the heat transfer may be performed only between the inlet pipe 171 and the outlet pipe 173. Thus, an irreversible loss due to the heat exchange between the heat exchange pipe 117 and the plate members 10 and 20 may be reduced.

Figure 22:
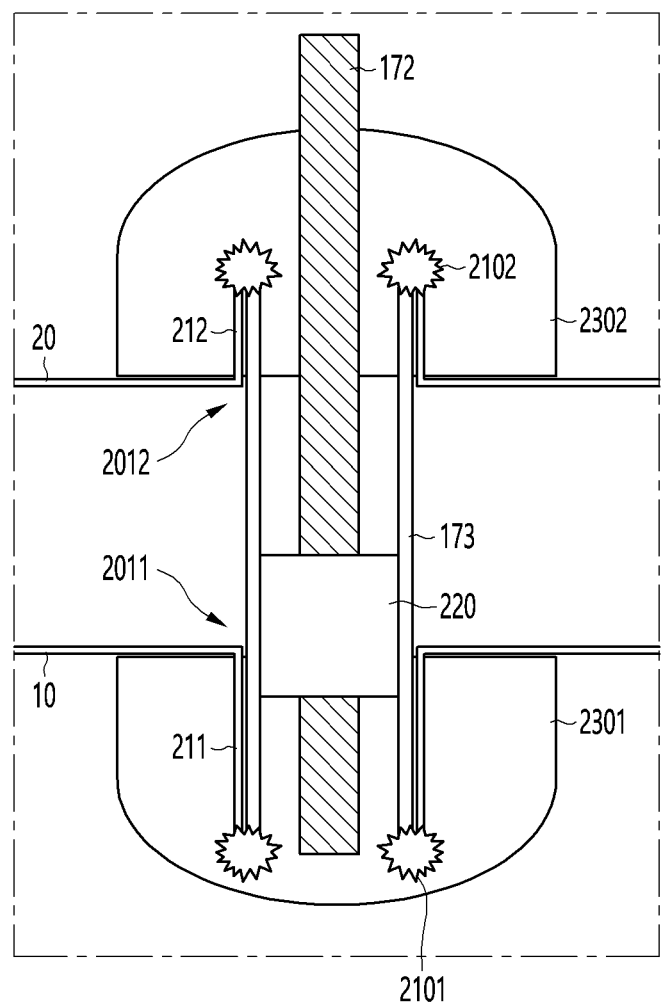
FIGS. 22 and 23 are views of a through sealing part according to another embodiment.
Figure 23:
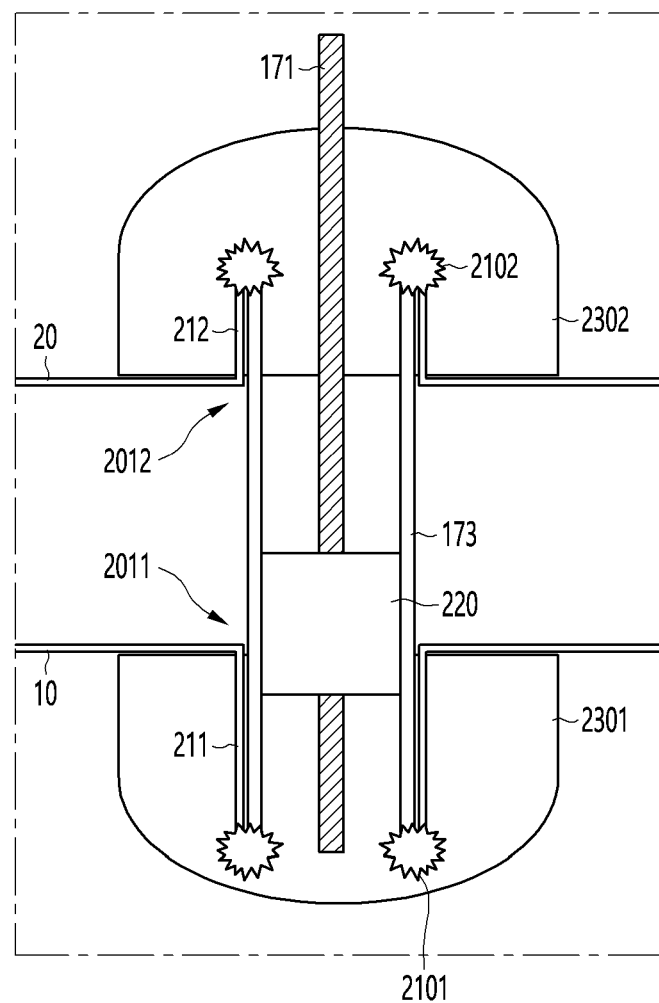

FIGS. 22 and 23 are views of a through sealing part 300 according to another embodiment. Here, FIG. 22 is a view of a through sealing part through which the outlet pipe 172 passes, and FIG. 23 is a view of a through sealing part 300 through which the inlet pipe 171 passes.

Referring to FIGS. 22 and 23, the inlet pipe 171 and the outlet pipe 172 may pass through the vacuum adiabatic body using separate or individual through-hole sealing parts shown in FIGS. 22 and 23, respectively. Thus, the inside and the outside of the refrigerator may be connected to each other. The inlet pipe 171 and the outlet pipe 172 may connect the evaporator in the refrigerator to the condenser outside the refrigerator.

The through sealing portion 300 (see FIG. 23) for the inlet pipe 171 and the through sealing portion 300 (see FIG. 22) for the outlet pipe 172 may be adjacent to each other. This is because the heat exchange is performed between the inlet pipe 171 and the outlet pipe 172, which may be adjacent to constitute the heat exchange pipeline 117 in a predetermined space so that an irreversible loss due to the heat exchange with the outside is not generated.

In this embodiment, the configurations and operations of the through-parts 2011 and 2012, the homogeneous welding parts 2101 and 2102, the protrusion end parts 211 and 212, the finishing members 2301 and 2302, and the filler 220 may be similarly applied to the description of FIG. 22.

The advantages of the embodiment shown in FIG. 21 may be applied as it is in the case of this embodiment. Particularly, the inlet pipe 171 and the outlet pipe 172 may pass through the wall of the vacuum adiabatic body together when the inlet pipe 171 and the outlet pipe 172 are located inside the sealing member 173. Also, since the sealing member 173 and the plate members 10 and 20 are welded with the homogeneous material via the homogeneous welding parts 2101 and 2102, possibility of damaging or destroying a vacuum state of the vacuum space part 50 due to a welding defect may be further reduced. Since the heat exchange pipe 117 and the plate members 10 and 20 do not directly contact each other, the heat loss or transfer due to the heat exchange between the heat exchange pipe and the plate members 10 and 20 may be reduced.

The embodiment of FIGS. 22-23 may be applied in the case where the inlet pipe 171 and the outlet pipe 172 are not withdrawn together in terms of the design of the refrigeration performance and the structure design of the refrigerator.

Hereinafter, a through sealing part or sealing assembly 300 according to another embodiment will be described with reference to FIGS. 24 to 32. The through sealing part 300 may be installed at a point at which the heat exchange pipeline 117 passes through the vacuum adiabatic body and provided to prevent heat from being transferred to the inside and outside that are partitioned by the vacuum adiabatic body.

An embodiment in which members such as the heat exchange pipeline 117, the electric line, etc. pass through the through sealing part 300 to pass through the inside and outside of the vacuum adiabatic body will be described. In an embodiment, the heat exchange pipeline 117 is exemplified. In an embodiment, if the electric line rather than the heat exchange pipeline 117 is provided, the heat exchange pipeline 117 may be regarded as a line representing the electric line as it is in the drawings.

In another embodiment, when the electric line is made of a flexible material, the electric line may be provided in the through sealing part 300 while being accommodated in a separate pipe. Thus, the sealing of the inside and outside of the refrigerator may be more completely performed.

Figure 24:
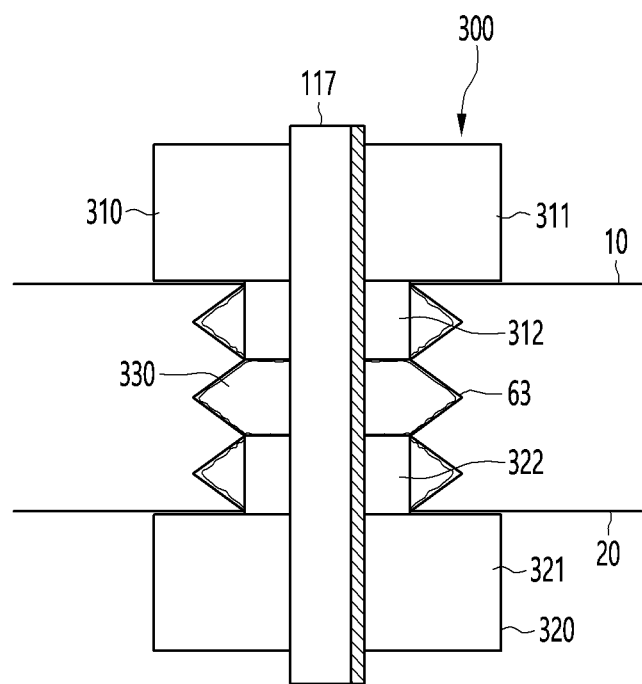
FIG. 24 is a cross-sectional view illustrating a configuration of a through sealing part.

FIG. 24 is a cross-sectional view illustrating a configuration of the through sealing part.

Referring to FIG. 24, the vacuum space part 50 is provided in the gap part between the plate members 10 and 20. A wrinkled or zig-zag conductive resistance sheet 63 illustrated in FIG. 8C may be provided at a portion through which the plate members 10 and 20 pass. The wrinkled conductive resistance sheet 63 may resist thermal conduction between the plate members 10 and 20 and prevent the members 10 and 20 from being damaged by a pressure difference between a vacuum pressure and an atmospheric pressure. Both ends of the wrinkled conductive resistance sheet 63 may be welded to the plate members 10 and 20, and thermal conduction may be further prevented by the wrinkle shape of the wrinkled conductive resistance sheet 63.

The heat exchange pipeline 117 passes through an inner space of the wrinkled conductive resistance sheet 63. Blocks 310 and 320 may be provided on upper and lower ends of the heat exchange pipeline 117 to block opened portions. A sealing member 330 may be provided in the blocks 310 and 320 to block a small ventilation.

The blocks 310 and 320 may be made of a soft material having a low heat conductive coefficient. The blocks 310 and 320 may be made of a material having a thermal conductivity less than that of each of the plate members 10 and 20 to resist thermal conduction between the plate members 10 and 20.

The wrinkled conductive resistance sheet 63 may alternatively be implemented as another member or plate having a small or large amount of wrinkles having a small size. For example, a flat thin plate-like member or an arc-shaped plate may be provided. A member connecting the through-part of the first plate member 10 to the through-part of the second plate member 20 to block vacuum leakage of the third space that is a vacuum space may be called a third plate member.

One surface of the third plate member may be supported by the blocks 310 and 320 and the sealing member 330, and thus, heat transfer through the third plate may be blocked by the blocks 310 and 320 and the sealing member 330.

The blocks will be described in detail.

The blocks 310 and 320 may be provided as a pair of members, which perform the same function. Although any one member is described, the description may be equally applied to the other member and other embodiments.

An outer supporter 311, which contacts an outer surface of the first plate member 10 to seal a gap or opening of the first plate member 10 is provided in the first block 310 provided at a side of the first plate member 10, i.e., in the inside of the refrigerator. The heat exchange pipe 117 may be supported by a first surface provided inside the outer supporter 311, and the through-part may be supported by a second surface provided on a bottom surface of the outer supporter 311. The outer supporter 311 may serve to support the heat exchange pipe 117 and perform an operation so that the block 310 is supported by the through-part.

An inner pusher 312 having a size corresponding to a cross-sectional size of the wrinkled conductive resistance sheet 63 may be further provided inside the outer supporter 311.

The inner pusher 312 may compress a sealing member 330 to fill the inner space of the wrinkled conductive resistance sheet 63. The sealing member 330 may be made of a material that is curable after a predetermined time elapses as a fluid such as liquid silicon. According to the sealing member 330, the entire gap or vacuum space part 50 excluding the inner pushers 312 and 322 and the heat exchange pipeline 117 may be sealed in the inner space of the wrinkled conductive resistance sheet 63. A material having a thermal conductivity less than that of the plate members 10 and 20 may also be applied to the sealing member 330.

The description of the outer supporter 311 is similarly applied to the outer supporter 321 of the second block 320, and the description of the inner pusher 312 is similar for the inner pusher 322 of the second block 320. The sealing member 330 may be condensed via the inner pusher 312 of the first block 310 at a first side, and the inner pusher 322 of the second block 320 at a second side.

The through sealing part 300 having the above-described structure may shield a flow and heat transfer of a gas passing through the inside and the outside of the vacuum adiabatic body even though the heat exchange pipeline 117 passes through the vacuum adiabatic body.

When the blocks 310 and 320 block the thermal conduction between the heat exchange pipe 117 and the third plate member and completely seal the heat exchange pipe 117 and the third plate member so that air does not pass through, the sealing member 330 may be omitted. In this case, only the blocks 310 and 320 may be called a sealing member. Here, when the block is initially applied, a synthetic resin having plasticity may be applied.

When the leakage of the cold air of the first space is not prevented by using only the blocks 310 and 320, the sealing member 330 may be applied. In this case, both the blocks 310 and 320 and the sealing member 330 may be called a sealing member. Here, the blocks 310 and 320 may mainly block thermal conduction, and the sealing member may mainly prevent cold air leakage.

The descriptions of the blocks 310 and 320 and the sealing member 330 may be equally applied to other embodiments with respect to the through sealing part.

FIGS. 25A, 25B, 26A, and 26B are views illustrating a process of manufacturing the through sealing part.

Figure 25A:
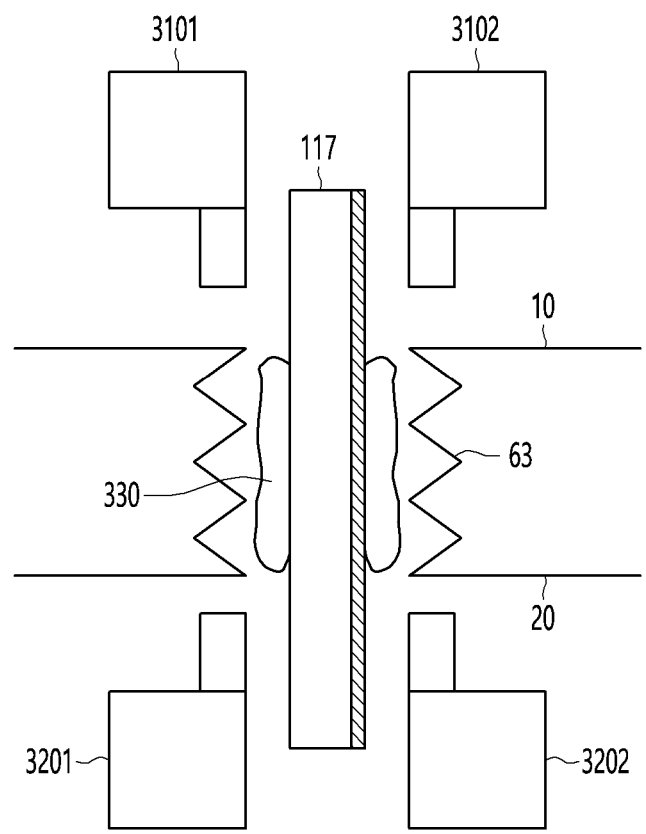
FIGS. 25A, 25B, 26A, and 26 are views illustrating a process of manufacturing the through sealing part.
Figure 25B:
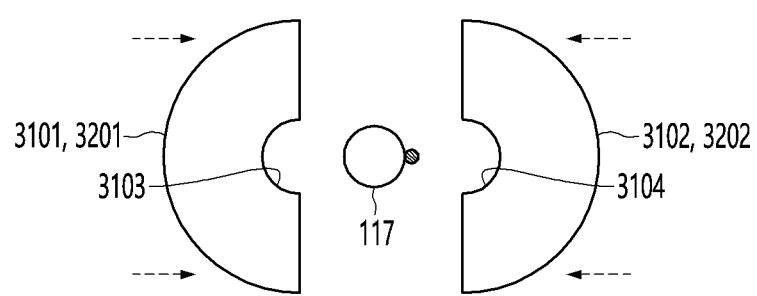

First, referring to FIGS. 25A and 25B, the blocks 310 and 320 may be divided into first or one-side blocks 3101 and 3201 and second or the other side blocks 3102 and 3202. The first block 310 will be described as an example, and the same description will be equally applied to the second block 320.

The first block 310 may be divided into a first or one-side block 3101 and a second or the other-side block 3102 to surround the heat exchange pipeline 117. When the first block 310 is provided as a single body, the first block 310 may be inserted from an end of the heat exchange pipeline 117 so as to be guided to a proper position. However, such a configuration may not be desirable because it causes difficulty in work or installation. In FIG. 25B, arrows indicate that one-side block 3101 and the other-side block 3102 are approaching toward the heat exchange pipeline 117 to surround the heat exchange pipeline 117. Predetermined grooves or recesses 3103 and 3104 may be defined in the blocks so that the one-side block and the other-side block surround the heat exchange pipeline 117.

In FIG. 25B, dotted lines indicate the corresponding positions of a vertical cross-section and a horizontal cross-section, and a relative position of the heat exchange pipeline 117 and the blocks 310 and 320 may be understood together.

A sealing member 330 may be inserted as a fluid in the inner space of the wrinkled conductive resistance sheet 63. The sealing member 330 may be provided to surround an outer surface of the heat exchange pipeline 117. The sealing member 330 may prevent the heat exchange pipeline 117 from contacting the wrinkled conductive resistance sheet 63 to sufficiently perform the function of the thermal conductive resistance by the conductive resistance sheet 53. Thereafter, the blocks 310 and 320 are pushed into the wrinkled conductive resistance sheet 63. Explanation will be given while changing the drawing.

Figure 26A:
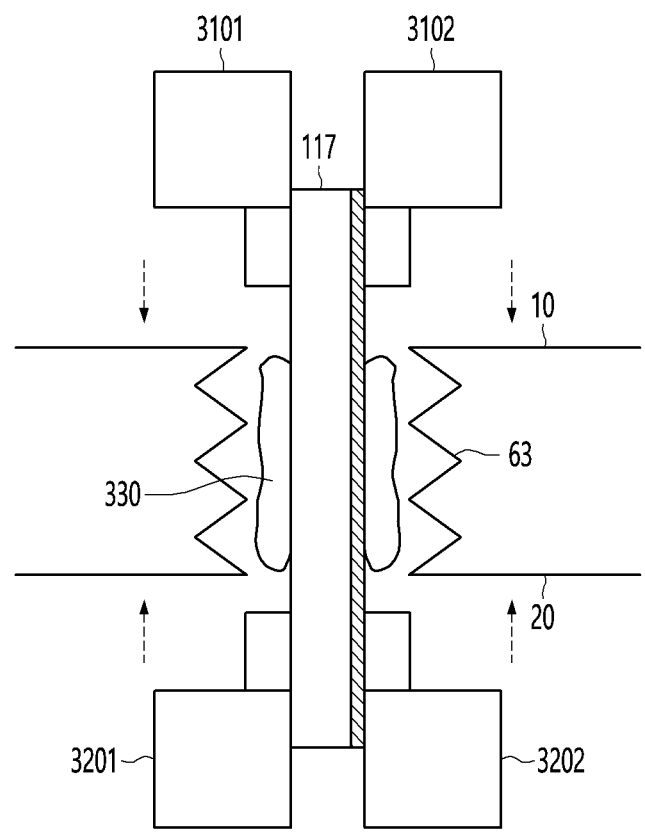
Figure 26B:
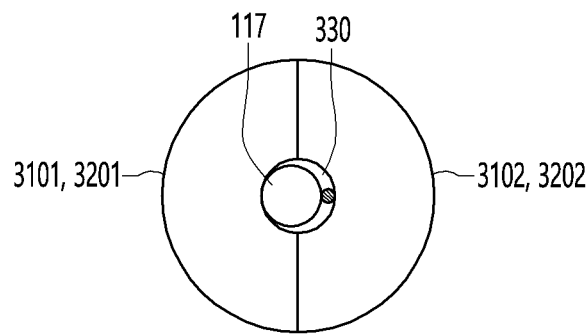

Referring to FIGS. 26A and 26B, the first and second blocks 310 and 320 are inserted into the wrinkled conductive resistance sheet 63. An arrow indicates a moving direction of the blocks 310 and 320.

Since the first and second blocks 310 and 320 are at least partially inserted into the wrinkled conductive resistance sheet 63, the sealing member 330 may be deformed to move to the spacing part between the heat exchange pipe 117 and the conductive resistance sheet 63 so as to be filled into the spacing part. Here, the inner pushers 312 and 322 may perform a function of a plunger that pushes and compresses the sealing member 330.

When the blocks 310 and 320 are sufficiently inserted into the wrinkled conductive resistance sheet 63, the sealing member 330 may be filled into the spacing part between the grooves 3103 and 3104 of the blocks and the heat exchange pipeline 117. Since the heat exchange pipeline 117 may be provided as a pair of pipes 171 and 172, it may be difficult to provide the grooves 3013 and 3104 so as to match outer appearances of the pipes 171 and 172. Due to this limitation, the sealing member 330 may be convenient in terms of production to prevent a gap between the grooves of the blocks 310 and 320 and the heat exchange pipeline 117 from occurring. The sealing member 330 may be an adhesive so that the blocks 310 and 320 are coupled to each other.

An arrow of FIG. 26A indicates that the inner pushers 312 and 322 push the sealing member 330 to seal the inside of the wrinkled conductive resistance sheet 63.

According to the through sealing part 300, the heat exchange pipeline 117 may perform the sealing on the inside and outside of a portion at which the heat exchange pipeline 117 passes through the vacuum adiabatic body, and heat transfer between the inside and the outside of the vacuum adiabatic body may be reduced.

The through sealing part 300 may block heat transferred through the through-part of the vacuum adiabatic body together with the pipeline adiabatic part 301. A mutual relationship between the through sealing part 300 and the pipeline adiabatic part 301 will be described by changing the drawing.

FIGS. 27 to 30 are views illustrating the mutual relationship between the through sealing part 300 and the pipeline adiabatic part 301.

Figure 27:
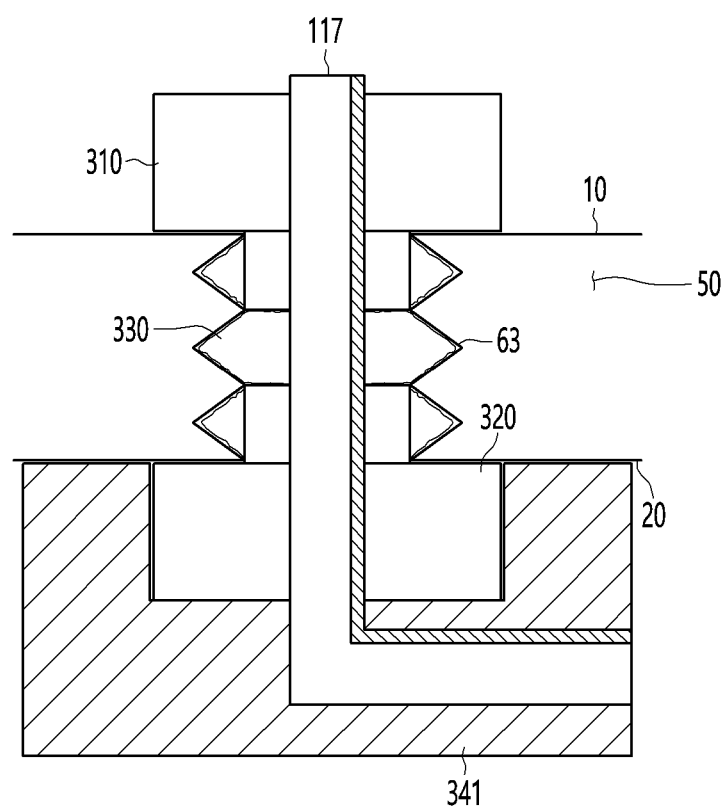
FIGS. 27 to 30 are views illustrating a mutual relationship between the through sealing part and the pipeline adiabatic part.

First, referring to FIG. 27, the pipeline adiabatic part 301 may provide a forward pipeline adiabatic part or space 341 having the through sealing part 300 at a center thereof. The adiabatic part 341 may expand in a forward direction along a plane perpendicular or forward from the plate member 10 or 20, while the heat exchange pipeline 117 may extend in a direction along the plate member 10 or 20.

The forward pipeline adiabatic part 341 may be attached to or provided at the second block and/or the second plate member 20 and/or the heat exchange pipeline 117 or be foamed into an inner space of a predetermined case.

Figure 28:
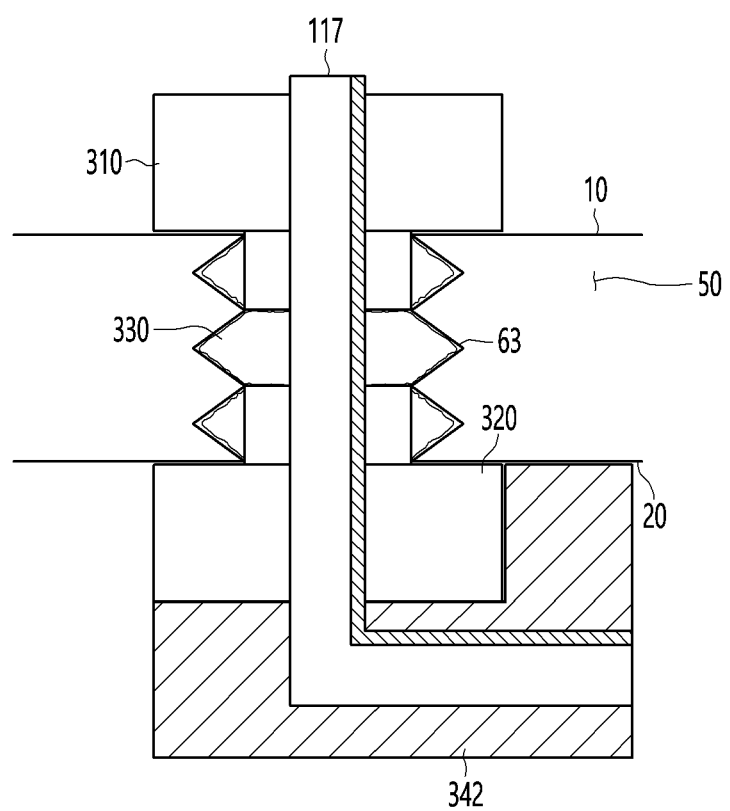

Referring to FIG. 28, the pipeline adiabatic part 301 may provide a one-way pipeline adiabatic part 342 extending in one direction of the through sealing part 300.

The one-way pipeline adiabatic part 341 may be attached to the second block 320 and/or the second plate member 20 and/or the heat exchange pipeline 117 or be foamed into an inner space of a predetermined case.

Figure 29:
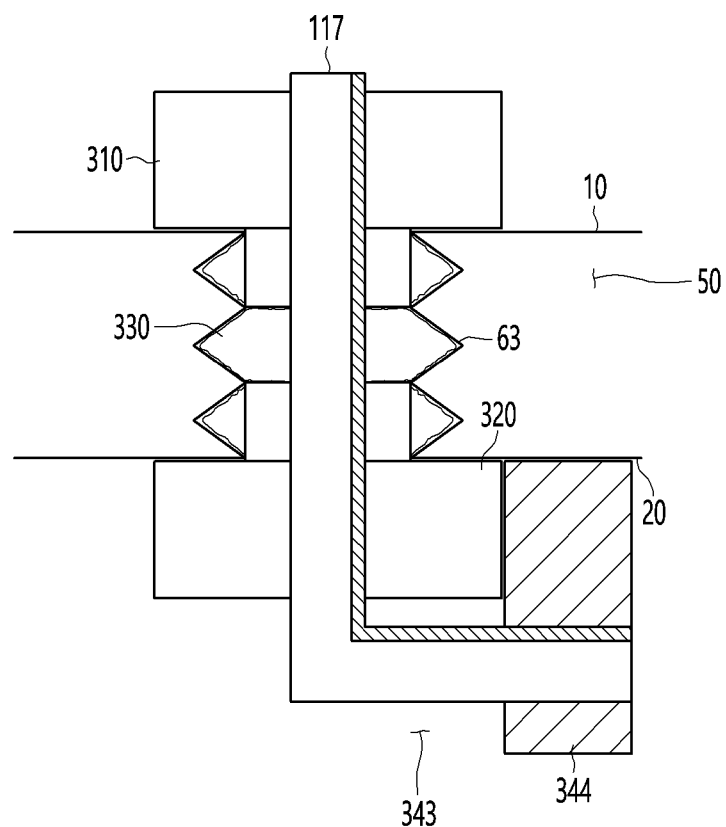

Referring to FIG. 29, the pipeline adiabatic part 301 may provide a one-side adiabatic part or space 344 provided at one side along the heat exchange pipeline 117 apart from the through sealing part 300. The one-side adiabatic part 344 may be fixed to the block 320 and/or the heat exchange pipeline 117 and/or the second plate member 20.

The other space through which the heat exchange pipeline 117 passes may provide an opening adiabatic part or space 343 so that the other space is separated from the vacuum space 50 and other spaces by the pipeline adiabatic case 302 to perform an adiabatic function.

Figure 30:
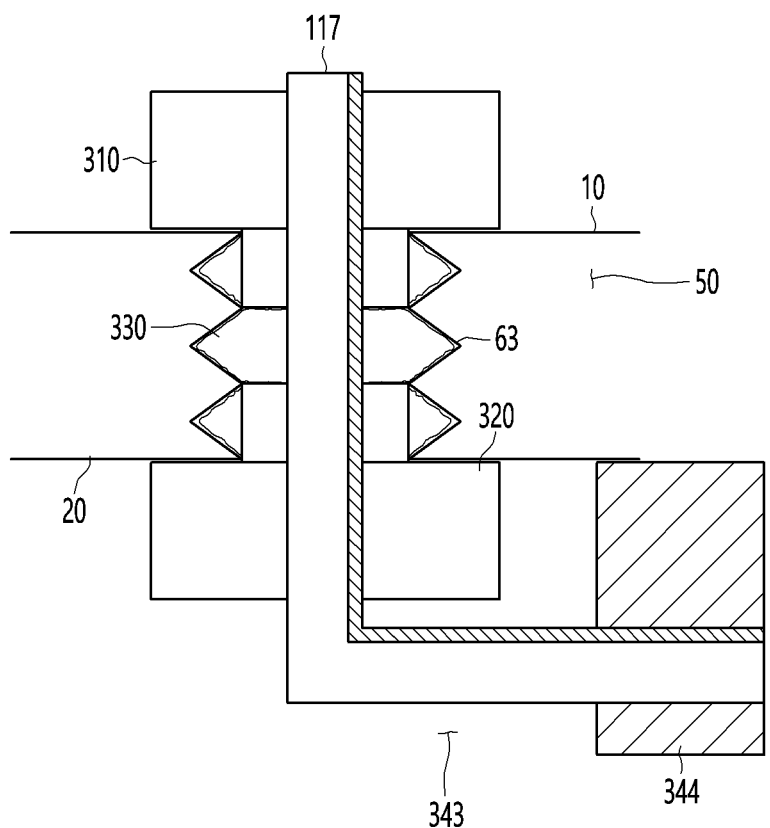

Referring to FIG. 30, unlike the case of FIG. 29, the one-side adiabatic part 344 may be provided to be separated from the block 320. This case may be applied to a case in which additional heat exchange between the inlet pipe 171 and the outlet pipe 172 is required when the heat exchange performance of the heat exchange pipeline 117 is insufficient.

The cases of FIGS. 29 and 30 may be preferably applied to obtain the adiabatic effect as a simple constitute when the thermal insulation to the first plate member 10 is required.

Figure 31:
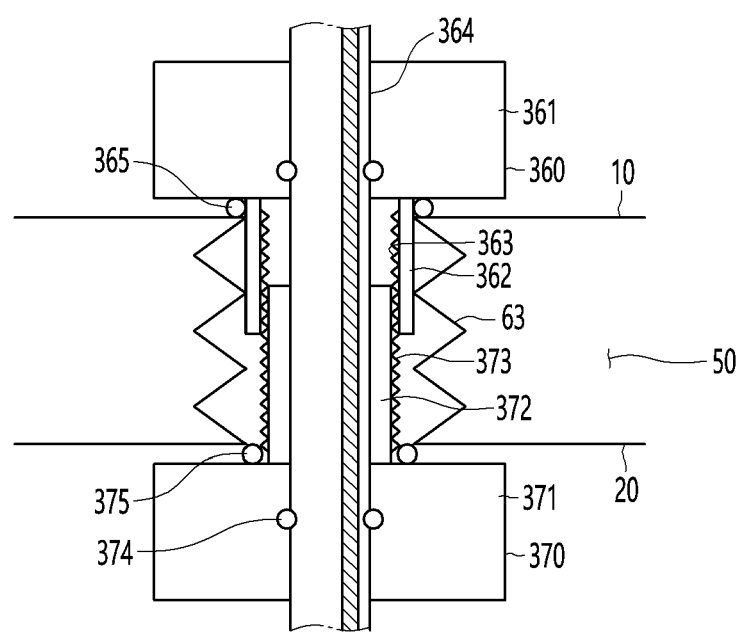
FIGS. 31 and 32 are views of a through sealing part according to another embodiment.
Figure 32:
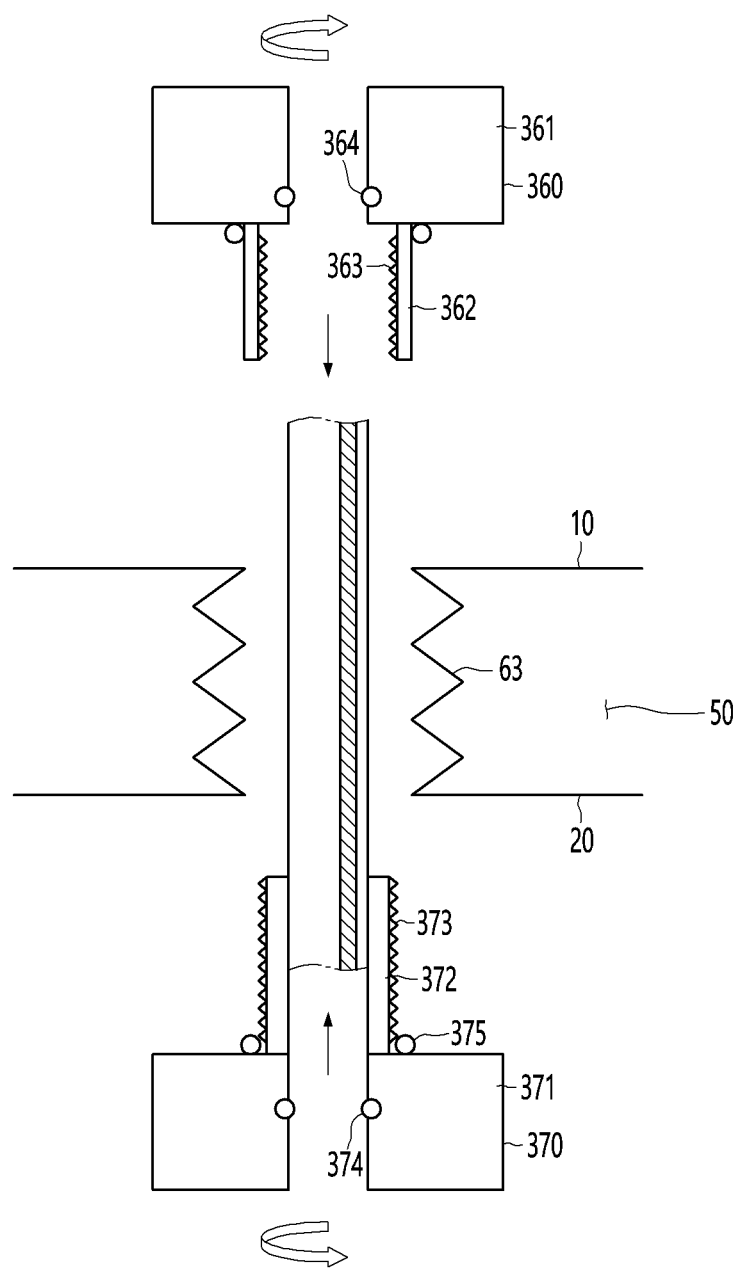

FIGS. 31 and 32 are views of a through sealing part 300 according to another embodiment.

Referring to FIG. 31, this embodiment is different from the embodiment of FIG. 24 in that male and female blocks are engaged with each other, and the sealing member 330 is changed to a sealer such as an O-ring. The description related to FIG. 24 may be applied as it is without any specific explanation.

A first block 360 may be disposed at a side of a first plate member 10, and a second block 370 may be disposed at a side of a second plate member 20. Since the blocks 360 and 370 are similar to each other, one will be described, and the same description will be applied to other blocks as well.

In the first block 360, an outer supporter 361 is caught to be supported on the first plate member 10, and an inner insertion part or pipe 362 is further disposed inside the outer supporter 361 and then inserted into a wrinkled conductive resistance sheet 63. A first coupling part 363 is disposed at at least one point of the inside and outside of the inner insertion part 362.

An outer supporter 371 and the inner insertion part 372 are further disposed on the second block 370. A second coupling part 373 is disposed at at least one point of the inside and outside of the inner insertion part 372.

The outer supporters 361 and 371 are caught on outer surfaces of the plate members 10 and 20 to seal contact surfaces between the blocks 360 and 370 and the plate members 10 and 20, respectively. Outer surface sealers 365 and 375 may be inserted into the contact surfaces of the blocks 360 and 370 and the plate members 10 and 20 to improve reliability of the sealing operation. Inner surface sealers 364 and 374 may be inserted into contact surfaces of inner surfaces of the outer supporters 361 and 371 and an outer surface of the heat exchange pipeline 117 to prevent a fluid from flowing to the inside and outside of the refrigerator. Each of the inner surface sealers 364 and 374 may have a cross-sectional shape similar to a shape of the outer surface of the heat exchange pipeline 117 to completely perform the sealing operation on the contact surfaces.

Each of the sealers 364, 365, 374, 375 may be made of rubber and provided in a manner in which an object made of an elastic material surrounds the outer surface of the block 360 and/or 370.

The coupling parts 363 and 373 may be provided as coupling units, which are disposed on surfaces corresponding to each other. For example, a female screw or thread and a male screw or thread may be provided to be coupled to each other by rotation thereof. The mutual contact surfaces of the sealers 364, 365, 374, and 375 may be sealed to approach each other by the coupling operation of the coupling parts 363 and 373.

The blocks 360 and 370 may be made of a rubber or plastic material and may not interrupt the action of the thermal conductive resistance of the wrinkled conductive resistance sheet 63. A spacing part between the wrinkled conductive resistance sheet 63 and the blocks 369 and 370 may be empty, or the sealing member 330 may be inserted into the spacing part to resist to the thermal conductive transfer and the flow of the fluid.

Referring to FIG. 32, although each of the blocks 360 and 370 is provided as one body, the two members of the blocks 360 and 370 may be integrated with each other in a state of being separated from each other like the embodiment of FIG. 20. After each of the blocks 360 and 370 is provided as one body, the blocks 370 may be coupled to each other in a state of being coupled to the outer surface of the heat exchange pipeline 117 to complete the coupling of the through sealing part 330.

A direction of an arrow indicates a moving direction and a rotation direction of each of the blocks 360 and 370.

Hereinafter, the electric line connecting the inside and the outside of the refrigerator, the operation of the electric line and the control of the refrigerator by the electric line will be described.

Figure 33:
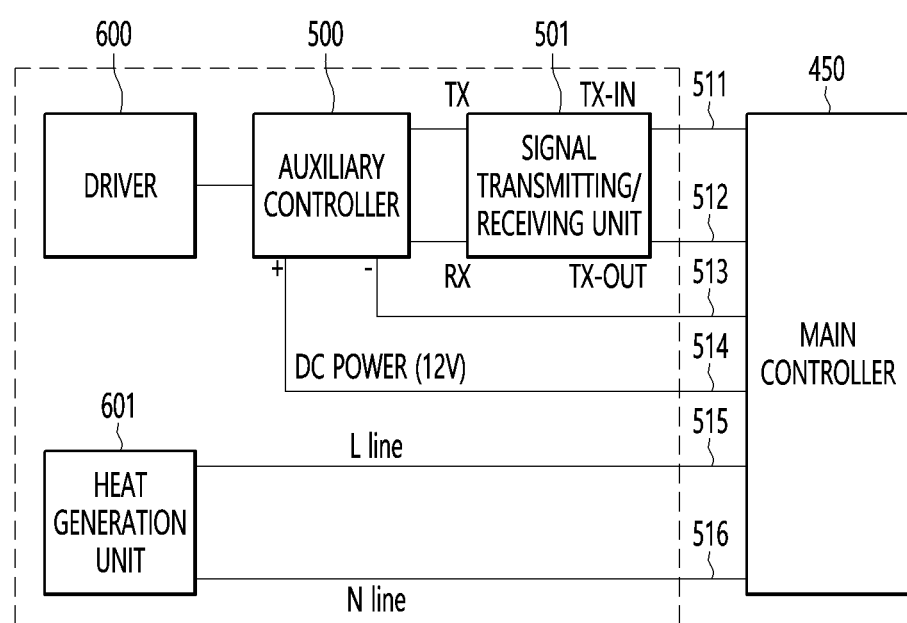
FIG. 33 is a view for explaining a control of the refrigerator.

FIG. 33 is a block diagram for explaining control of the refrigerator or appliance. In FIG. 33, a dotted line indicates a line separating the inside and the outside of the refrigerator, and the inside of the rectangle provided by the dotted line indicates the inside of the refrigerator.

Referring to FIG. 33, a main controller 450 is provided outside the refrigerator. The main controller 450 is responsible for the overall control of the appliance to which the vacuum adiabatic body is applied. When the appliance is a refrigerator, the main controller 450 performs overall control of the refrigerator. The main controller 450 may be provided on a top surface of the refrigerator. Hereinafter, the refrigerator will be described as an example, but it is needless to say that it is not limited to the refrigerator.

In the main controller 450, six lines 511-516 may be led into the refrigerator. Two AC lines 515 and 516 of the six lines supply energy to a heat generation unit or heat generator 601 in which AC power is used. Two DC lines 513 and 514 of the six lines are lines for supplying energy to various drivers 600 and an auxiliary controller 500 in which DC power is used in the refrigerator. Two signal lines 511 and 512 of the six lines are lines for supplying a control signal to the various drivers 600 and the auxiliary controller 500, which perform the control in the refrigerator. The two signal lines may be connected to a signal transmitting/receiving unit 501, which may also be referred to as a signal transmitter/receiver or a signal transceiver.

The auxiliary controller 500 and the main controller 450 are connected by a connection line. The connection line may include the two DC lines 513 and 514 and the two signal lines 511 and 512.

The main controller 450 may be called a first controller, which is placed outside the refrigerator, and the auxiliary controller 500 may be a controller that is placed inside the refrigerator to partially receive the control of the first controller to operate and thus be called a second controller.

Current supplied by direct current (DC) lines 513 and 514 may be directly applied to the components of the driver 600 and the driving of the auxiliary controller 500 and be provided in the energy supply form in which an additional rectifier or a transformer is not required. Thus, in this case, since the number of heat generation devices 601 such as the rectifier or the transformer is reduced, energy consumption efficiency of the refrigerator may be improved.

The main controller 450 and the auxiliary controller 500 may be connected to each other through a process in which control signals of the signal lines 511 and 512 are digitally processed through the signal transmitting/receiving unit 501.

Each of the AC lines 515 and 516, the DC lines 513 and 514, and the signal lines 511 and 512 may be provided as two lines for a smooth current flow. However, this embodiment is not limited thereto. For example, the lines may be provided as a single line or three or more lines within the scope understood by the technical ideas. For example, the signal lines 511 and 512 may be applied to a single line in some cases for time division and other ways for the reception and transmission. However, in order to apply commercial serial communication, two lines may be applied. The AC line and the DC line may supply three-phase energy.

The AC lines 515 and 516 are provided for driving the heat generation unit 601 irrespective of the number of lines, the DC lines 515 and 516 for direct use to the driver 600 and the auxiliary controller 500 are provided, and signal lines 511 and 512 for transmitting and receiving control signals to the driver 600 and the auxiliary controller 500 may be provided.

As the most general and universal application may be implemented, the two lines may be provided for each of the AC line, the DC line, and the signal line. Here, each of the lines is based on a vector flow and frequency of the current, and a plurality of current lines through which the same current flows are assumed to be a single line. For example, a coaxial cable may be regarded as having two lines together even if it has a single appearance. Thus, six lines may be inserted into the refrigerator from the main controller 450 within the refrigerator.

It may be seen that the number of lines 511 to 516 is drastically reduced compared to the case of related art where about 40 lines are introduced into the refrigerator. With six lines, there is an advantage in that a size of the through-part or opening passing through the vacuum adiabatic body is reduced, and the number of through-parts is reduced. Thus, the energy consumption efficiency of the refrigerator may be improved, and the adiabatic efficiency of the vacuum adiabatic body may be improved.

Here, since all of the six lines 511-516 are led in the refrigerator through the single pipeline 64 (FIG. 2), it is advantageous that the adiabatic efficiency is improved, and the manufacturing convenience is further improved.

Figure 39:
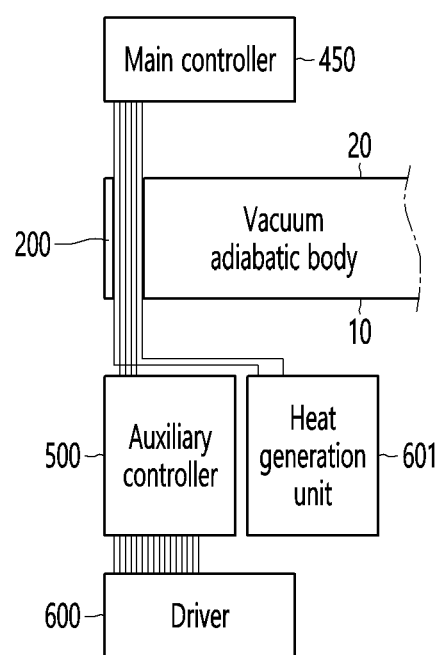

The six lines may be guided into the refrigerator through a path through which the electric lines pass. In detail, the six lines may be guided into the refrigerator through a gap between the vacuum adiabatic body and a sealing or side frame or cover 200 (FIG. 39).

In this case, the two DC lines 513 and 514 and the two signal lines 511 and 512 provided as the connection lines for connecting the main controller 450 and the auxiliary controller 500 may be divided into three cases or sections in terms of geometric position. Particularly, the lines may be divided into a first connection line or section provided in a first space, a second connection line or section provided in a second space, and a third connection line or section passing from the first space to the second space.

Here, in the case of the third connection line, in order to electrically connect the first space to the second space without passing through the vacuum adiabatic body, the third connection line may be provided to pass through the gap between the main body-side vacuum adiabatic body and the door, i.e., pass between the third space and the door.

Here, since all of the six lines are led in the refrigerator through the single path, it is advantageous that the adiabatic efficiency is improved, and the manufacturing convenience is further improved.

Alternatively, the six lines may be guided through the pipeline 64 into the refrigerator. Of course, this embodiment is not limited to these two methods, various other methods may be further included.

Among the six lines 511-516, the AC lines 515-516 and the DC lines 513-415 occupying four lines may be power lines.

Figure 34:
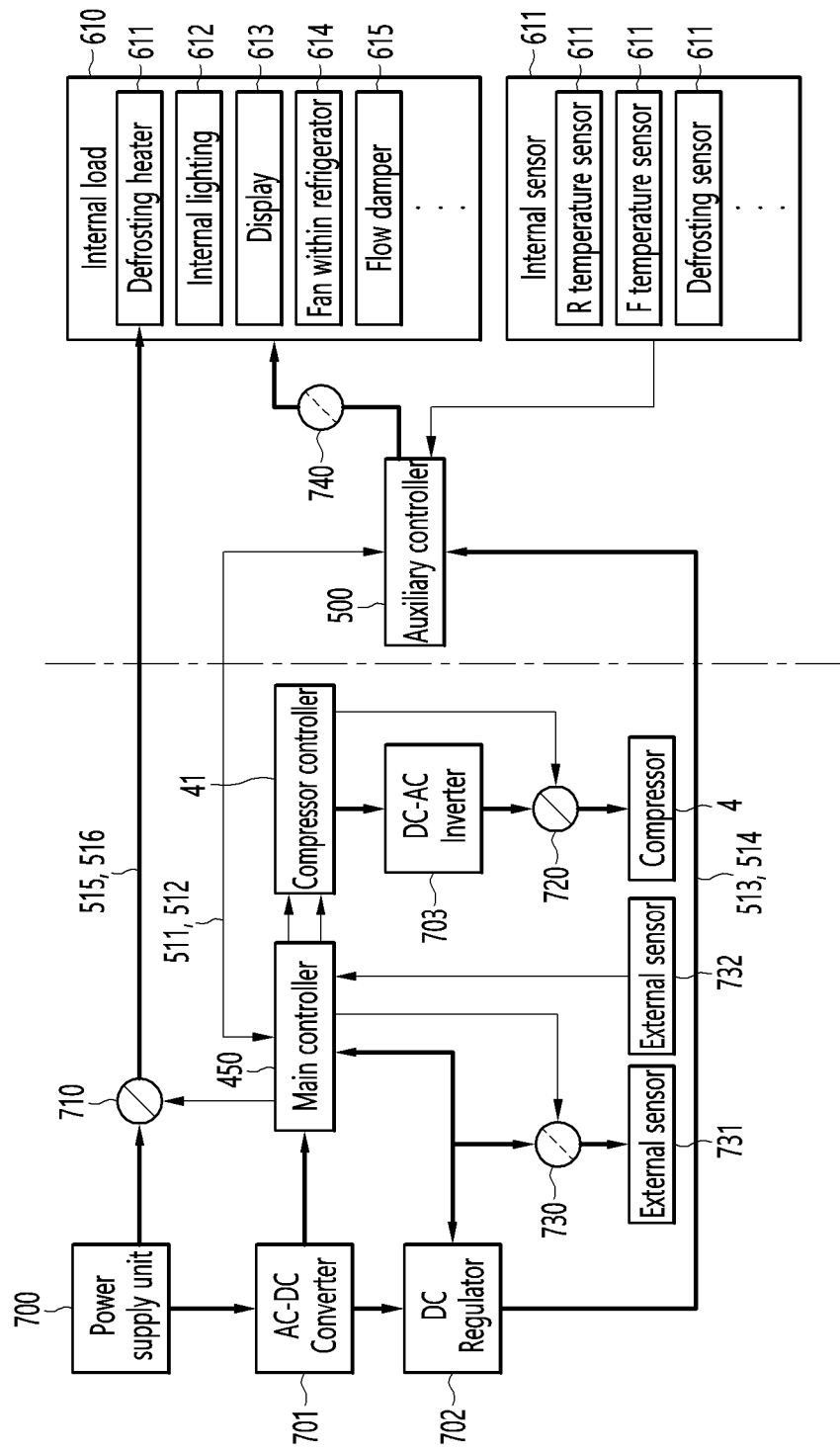
FIG. 34 is a view for explaining an overall control of the refrigerator in detail with respect to six lines.

FIG. 34 is a view for explaining an overall control of the refrigerator in detail together with the six lines.

FIG. 34 may be roughly divided into an outer space or exterior of the refrigerator at a left side of the dotted line and an inner space or interior of the refrigerator at a right side. The main controller 450 is provided outside the refrigerator, and the auxiliary controller 500 is provided inside the refrigerator. The main controller 450 may control the entire operation of the refrigerator, and the auxiliary controller 500 may control various devices such as a load and a sensor in the refrigerator.

The passing through the inside and the outside of the refrigerator may be performed by allowing the lines 511-516 to pass through the through-part or opening provided in the vacuum adiabatic body. The passing through the through-part may be performed without the adiabatic loss according to various embodiments as described above.

As described above, the two AC lines 515 and 516, the two DC lines 513 and 514, and the two signal lines 511 and 512 may be provided from the outside to the inside of the refrigerator, through the vacuum adiabatic body, or led into the refrigerator by turning around the outside of the vacuum adiabatic body.

The power connection shown by a bold arrow will be mainly described.

The power supplied from the outside of a power supply unit or power controller 700 may be controlled and supplied in a form that is necessary for the operation of the refrigerator. AC power output from the power supply unit 700 is controlled by a first analog switch 710 and may be supplied to a heat generation unit or generator 601 through the AC lines 515 and 516. The heat generation unit 601 may include a defrosting heater 611. The first analog switch 710 may be controlled by the main controller 450. The first analog switch 710 may be a relay switch to which a solenoid is applied. The first analog switch 710 is a device for interrupting a large amount of electricity in an analog manner, and the first analog switch 710 is located outside the refrigerator as shown in the drawings because a large amount of heat is generated.

The power supplied from the power supply unit 700 may be converted to DC in an AC-DC converter 701 and supplied to the main controller 450. The DC power is rectified by a DC rectifier or regulator 702 and supplied to the main controller 450. The DC power rectified by the DC rectifier 702 is supplied to a place or device, at which the DC power is required, under the control of the main controller 450. The AC-DC converter 701 and the DC rectifier 702 may be provided outside the refrigerator as the heat generation components in which the switching operation is repeated. The main controller 450 controls the power supplied from the outside of the refrigerator as a whole.

The power supplied from the DC rectifier 702 may be controlled by a first digital switch 730 and supplied to an external load 731 outside the refrigerator. The external load 731 may correspond to a user display and various other control devices.

The main controller 450 may supply the DC power to a compressor controller 41. The compressor controller 41 may generate AC power using a DC-AC inverter 703 and a second analog switch 720 and operate the compressor 4 using a switching action of the compressor 4. The second analog switch 720 may be similar in operation to the first analog switch 710. This is because a large amount of energy is supplied to the compressor 4 and the heat generation unit 601.

The DC-AC inverter 703 and the second analog switch 720 may be provided outside the refrigerator as heat generation components that involve a switching operation and a physical operation.

The DC power supplied from the DC rectifier 702 is supplied to the auxiliary controller 500 through the DC lines 513 and 514. The auxiliary controller 500 may supply the DC power to an internal load 610 within the refrigerator in the state of being controlled using a second digital switch 740. Since the digital switches 730 and 740 operate in a digital manner using software using a chip, little heat is generated. Thus, the second digital switch 740 may not be a factor for lowering the adiabatic effect even if it is placed in refrigerator.

The defrosting heater 611 constituting a portion of the heat generating unit 601 among the internal loads 610 may be supplied with energy through the AC lines 515 and 516 as components requiring high energy as described above.

The main controller 450 may control the power supplied to the external load 731 using the first digital switch 730.

The main controller 450 may be connected to the auxiliary controller 500 by the signal lines 511 and 512 so that a sensing signal and a control signal are transmitted and received between the main controller 450 and the auxiliary controller 500. Here, since a separate pre-defined signaling scheme is performed between the two controllers 450 and 500, limitations such as crosstalk or transmission failure may not occur.

The main controller 450 may receive a signal from an external sensor 732 to utilize the signal as information that is necessary for operation of the refrigerator.

The main controller 450 may adjust an operation frequency of the compressor 4 by using the compressor controller 41 according to a load status of the refrigerator and the user's request status. For this, the main controller 450 may transmit a control signal to the compressor controller 41 to not only adjust the frequency by using the DC-AC inverter but also interrupt a driving signal by using the second analog switch 720.

The control signal transmitted from the main controller 450 to the sub controller 500 may be used as an operation control of the internal load 610 by the auxiliary controller 500 controlling the second digital switch 740.

The second digital switch 740 may control a plurality of loads and control an independent single load. The second digital switch 740 is illustrated as one in the drawing, but a plurality of second digital switches may be provided for each load or device.

The auxiliary controller 500 may receive various information measured by an internal sensor 620, perform an operation through determination in itself, and transmit the information to the main controller 450 when help of the main controller 450 is required.

The internal load 610 may include a number of components necessary for operation of the refrigerator. For example, the internal load 610 may include components such as an internal lighting 612, a display 613, a fan 614 within the refrigerator, and a flow damper 615.

The internal sensor 620 may include a number of configurations for determining the control status of the refrigerator. For example, the internal sensor 620 may include a refrigerating compartment temperature sensor 621 ("R temperature sensor"), a freezing compartment temperature sensor 622 ("F temperature sensor), and a defrosting sensor 623

As illustrated in FIGS. 33 and 34, according to the embodiment, the number of electric lines connecting the inside and the outside of the refrigerator may be optimized as the AC line, the DC line, and the signal line so as to reduce the size of the through-part and the number of through-parts of the vacuum adiabatic body, thereby leading to an stable operation of the refrigerator.

A rectifier, a switching member, or the like, which generates heat at the time of operation of the refrigerator, is located outside the refrigerator to remove the heat source in the refrigerator. Therefore, energy consumption efficiency of the refrigerator may be improved.

The lines required for the control of the refrigerator may be connected to each other by direct connection between the main controller 450 and the auxiliary controller 500. The auxiliary controller 500, the internal load, and the internal sensor may also be directly connected. Thus, stability of signal transmission/reception between the controllers 500 and 450 or between the controller and the load may be secured so that the refrigerator operates stably.

A commercial load and a sensor using a DC power source as a driving source or a DC signal as a control signal may be applied as it is to the refrigerator to which the vacuum adiabatic body is applied. Therefore, manufacturing cost of the refrigerator to which the vacuum adiabatic body is applied may be reduced.

Figure 35:
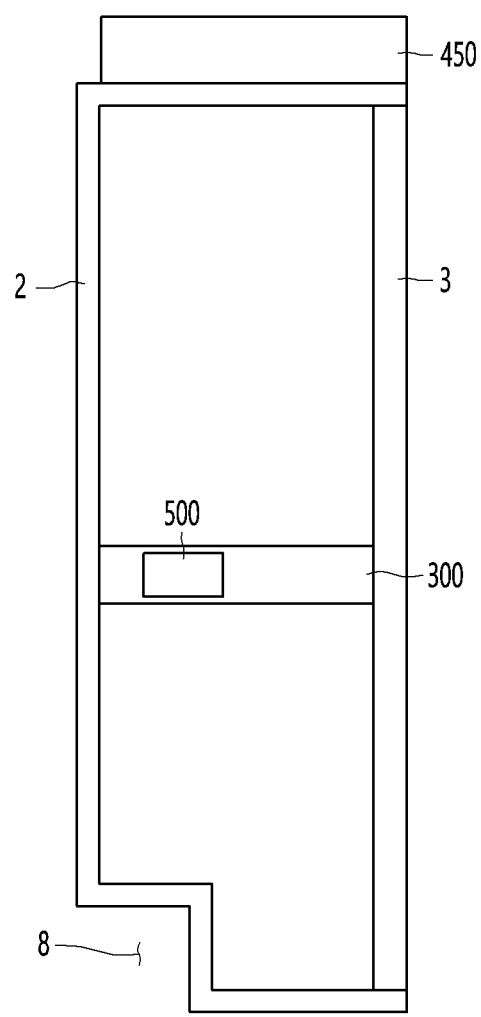
FIG. 35 is a view illustrating installed positions of a main controller and an auxiliary controller.

FIG. 35 is a view illustrating installed positions of the main controller 450 and the auxiliary controller 500. In this case, the refrigerator may be suitably applied in the case of using the vacuum adiabatic body.

Referring to FIG. 35, the main controller 450 may be provided outside the top surface of the refrigerator. The power supply unit 700 (FIG. 34) or the like may be provided at a position that is integrally or adjacent to or spaced apart from the main controller 450.

The auxiliary controller 500 may be provided on a mullion or partition wall 300 of the refrigerator. The mullion 300 may adiabatically divide the refrigerating compartment and the freezing compartment and may be made of a predetermined adiabatic material.

The auxiliary controller 500 may be maintained to be insulated from the inside of the refrigerator in the mullion 300 so that the heat generated during the operation of the auxiliary controller 500 does not affect the inside of the refrigerator.

The paths of the lines 511 to 516 connected to the auxiliary controller 500 in the main controller 450 will be briefly described.

First, the lines 511-516 (FIG. 34) may be guided through a path through which the electric lines pass. In detail, the lines 511-516 may connect the inside and the outside of the refrigerator through the gap between the vacuum adiabatic body and the sealing frame 200 (FIG. 39) so as not to penetrate the vacuum adiabatic body. In this case, six lines 511 to 516 may be guided through the path described in detail.

Alternatively, the line may be guided through the pipeline 64 such that the lines 511-516 pass through the vacuum adiabatic body to connect the inside and the outside of the refrigerator.

This manner in which the lines 511 to 516 are guided through the gap between the vacuum adiabatic body and the sealing frame 200 (FIG. 39) has been described in detail with reference to the drawings. The connection relationship between the main controller 450 and the auxiliary controller 500 when the pipeline 64 is provided will be described.

Figure 36:
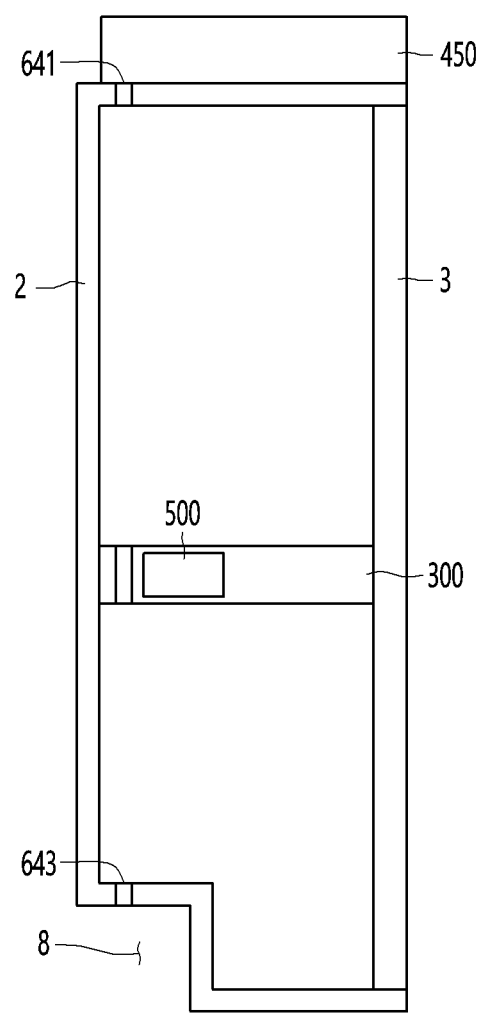
FIG. 36 is a view for explaining connection between the main controller and the auxiliary controller when a pipeline is used.

FIG. 36 is a view for explaining connection between the main controller and the auxiliary controller when the pipeline is used.

Referring to FIG. 36, a first pipeline 641 is provided in the vacuum adiabatic body of the main body 2. The first pipeline 641 may be a member passing through the inside and the outside of the vacuum adiabatic body and be disposed inside the wrinkled conductive resistance sheet 63. In some cases, the pipeline 64 may not be provided, and the wrinkled conductive resistance sheet 63 may serve as the pipeline 64. However, a separate member, which is exemplified by the adiabatic material, may be applied to the pipeline 64 in terms of heat transfer reduction.

Six lines 511 to 516 may pass through the first pipeline 641, and the lines 511-516 may connect the main controller 450 to the auxiliary controller 500. The lines 511-516 passing through the first pipeline 641 and extending into the refrigerator may extend into the inside of the mullion 300 along the inner wall of the vacuum adiabatic body and may be connected to the auxiliary controller 500.

The auxiliary controller 500 may be connected to a plurality of loads and sensors in the refrigerator to control the operation of the refrigerator. Here, the lines 511-516 may extend along the inner surface of the vacuum adiabatic body.

The auxiliary controller 500 may be provided in the mullion 300 to increase the internal space of the refrigerator, to reduce the influence of heat generation, and to maintain a rated temperature for the normal operation of the controller 500. However, when there is restriction on the installation of the mullion 300, the auxiliary controller 500 may be positioned in another separate space in the refrigerator, and the mullion 300 may perform only the role of allowing the lines 511-516 to pass therethrough.

A second pipeline 643 may be provided on either side of the vacuum adiabatic body adjacent to the machine room 8. The second pipeline 643 may be used as a pipeline through which the defrosting water is removed to the outside of the refrigerator.

Figure 37:
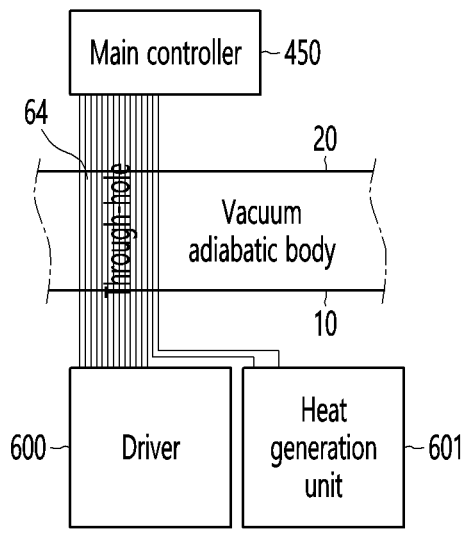
Figure 38:
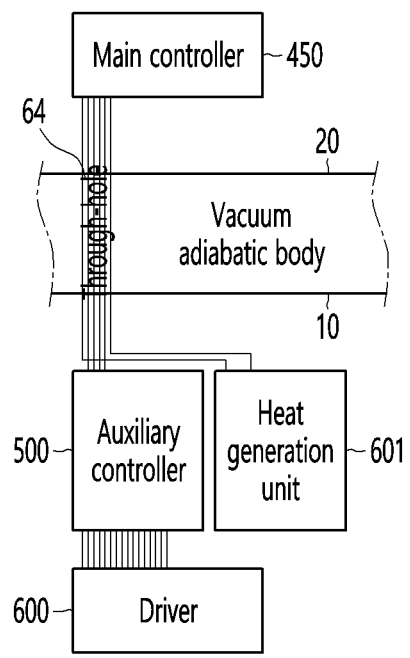

FIGS. 37 to 39 are views for comparing and explaining a configuration of control of the refrigerator, wherein FIG. 37 is a view of a case in which a plurality of lines, e.g., about 40 lines are inserted into the refrigerator in the main controller according to the related art, FIG. 38 is a view of a case in which six lines pass through the pipeline, and FIG. 39 is a view of a case in which the six lines pass through a spacing part between the sealing frame and an outer surface of the main body.

First, referring to FIG. 37, although the drawing shows the provision of ten or more lines, this is due to the difficulty of the illustration, and in practice much more lines pass through the vacuum adiabatic body according to the related art. To allow many electric lines to pass through the pipeline 64, the size of the pipeline 64 has to increase, or the number of pipelines 64 has to increase. This is undesirable because it causes adiabatic loss, restriction of refrigerator design, and installation difficulty. Alternatively, even if the gap between a sealing frame 200 (FIG. 39 (and the vacuum adiabatic body is used, it is necessary to provide a wider gap than that provided by the sealing frame 200, which results in difficulty in realization of the adiabatic effect.

According to the embodiment for solving such a limitation, as described in detail above, it is proposed that only the six lines connect the inside and outside of the refrigerator.

Referring to FIG. 38, the six lines 511 to 516 pass through the pipeline 64. Thus, it is not necessary to enlarge the pipeline 64, and there is no need to increase the number of pipelines. Thus, the adiabatic loss may be reduced, and the design constraint may be eliminated.

Referring to FIG. 39, it is seen that the six lines 511 to 516 pass through the gap between the sealing frame 200 and the outer surface of the main body 2 and are guided into the refrigerator. Thus, it is not necessary to enlarge the gap, and the six lines 511 to 516 may be provided similarly to the case where the number of electric lines increases.

Details of the sealing frame 200 may be found in co-pending U.S. application Ser. No. 16/980,288 filed on Sep. 11, 2020, a U.S. National Stage Application under 35 U.S.C. § 371 of PCT Application No. PCT/KR2019/007753, filed Jun. 26, 2019, the entire contents of which are herein incorporated by reference.

In this case, since the AC lines 515 and 516 connecting the heat generation unit 601 are physically large in diameter, and the other lines use a small line, the structure using the gap between the sealing frame 200 and the main body 2 may be sufficiently utilized.

INDUSTRIAL APPLICABILITY

When the present disclosure is applied, it may be possible to prevent or reduce the deterioration in the adiabatic performance of the refrigerator and to facilitate the product design while performing the stable control of the refrigerator to which the vacuum adiabatic body is applied. As a result, the commercialization of the refrigerator to which the vacuum adiabatic body is applied may be promoted.

The invention claimed is:

1. A vacuum adiabatic body comprising:
   a first plate configured to define at least a portion of a wall for a first space, the first plate having a first opening;
   a second plate configured to define at least a portion of a wall for a second space, the second plate having a second opening;
   a third space provided between the first plate and the second plate and configured to be a vacuum space;
   a support configured to maintain a distance between the first plate and the second plate;
   a heat resistance sheet configured to reduce a heat transfer between the first plate and the second plate;
   an electric line passing through the first and second openings to allow current to flow between the first space and the second space; and
   a sealing plug configured to surround the electric line at the first and second openings, the sealing plug including a first portion configured to pass through the first opening and a second portion configured to pass through the second opening to seal the first and second openings so as to prevent fluid communication between the first space and the second space.

2. The vacuum adiabatic body according to claim 1, wherein the sealing plug includes a block supported by the first plate and the second plate so as to be fixed in position, and the block being made of a material having a thermal conductivity less than that of each of the first plate and the second plate.

3. The vacuum adiabatic body according to claim 1, wherein the first and second openings face each other.

4. The vacuum adiabatic body according to claim 1, wherein the sealing plug includes:
   a third plate configured to seal the third space; and
   a block supported by at least one of the first plate or the second plate and made of a material having a thermal conductivity less than that of the first plate or the second plate.

5. The vacuum adiabatic body according to claim 1, wherein the sealing plug is provided between the first and second openings.

6. A refrigerator comprising:
   a wall provided between a first space configured to store items from a second space, the wall having a first plate and a second plate facing each other to create a third space therebetween, the third space being configured to be in a vacuum state;
   a door configured to allow access to the first space;
   a support configured to maintain a distance between the first and second plates defining the third space;
   at least one first electronic device provided in the first space;
   at least one second electronic device provided in the second space;
   a first controller provided in the first space to transmit or receive a signal to or from the first electronic device;
   a second controller provided in the second space to transmit or receive a signal to or from the second electronic device;
   at least one opening provided in the wall of the vacuum adiabatic body;
   a plurality of first wirings coupling the first electronic device to the first controller;

a plurality of second wirings coupling the second electronic device to the second controller; and
a plurality of third wirings passing through the opening to connect the first controller to the second controller, wherein the number of third wirings is less than the number of second wirings.

7. The refrigerator according to claim 6, further comprising a plurality of fourth wirings passing through the opening, wherein the at least one first electronics device includes a heat generator, the plurality of fourth wirings connects the second controller to the heat generator, and the number of third and fourth wirings is less than the number of second wirings.

8. The refrigerator according to claim 7, wherein the heat generator comprises a defrosting heater.

9. The refrigerator according to claim 7, wherein the plurality of fourth wirings are alternating current lines through which alternating current (AC) flows.

10. The refrigerator according to claim 6, wherein the total number of third wirings is four.

11. The refrigerator according to claim 6, wherein the second controller is a main controller, the first controller is an auxiliary controller that operates under the control of the main controller, and the plurality of third wirings includes:
a direct current line through which the main controller supplies direct current (DC) to the auxiliary controller; and
a signal line through which a control signal, through which the main controller controls the auxiliary controller, flows.

12. The refrigerator according to claim 6, further comprising a heat resistance sheet configured to reduce a heat transfer between the first and second plates, wherein all of the plurality of third wirings pass through the same opening.

13. A refrigerator comprising:
a main body having a vacuum adiabatic body to form an inner space configured to store items;
a door configured to open or close the main body to allow access to the inner space from an exterior space;
a heat generator provided in the inner space;
a power supplier provided in the exterior space; and
an alternating current line configured to connect the heat generator to the power supplier;
a compressor configured to compress a refrigerant;
a condenser configured to condense the compressed refrigerant;
an expansion device configured to expand the condensed refrigerant; and
an evaporator configured to evaporate the expanded refrigerant so as to dissipate heat,
wherein the vacuum adiabatic body includes:
a first plate configured to define at least a portion of a wall for the inner space;
a second plate configured to define at least a portion of a wall for the external space;
a third space provided between the first and second plates and configured to be a vacuum space;
a support configured to maintain a distance between the first and second plates defining the third space;
a heat resistance sheet configured to reduce heat transfer between the first plate and the second plate; and
at least one opening provided in at least one of the first plate or the second plate and through which the alternating current line passes.

14. The refrigerator according to claim 13, further comprising:
a main controller provided in the exterior space;
an auxiliary controller provided in the inner space; and
a connection line configured to connect the main controller to the auxiliary controller,
wherein the connection line passes through the opening.

15. The refrigerator according to claim 14, wherein the opening includes a first single opening provided in the first plate and a second single opening provided in the second plate and facing the first single opening to form a single opening through the vacuum adiabatic body.

16. The refrigerator according to claim 14, wherein the alternating current line and the connection line comprise six lines with respect to a flow of current.

17. The refrigerator according to claim 13, further comprising a sealing member configured to surround the alternating current line and coupled to at least one of the first plate or the second plate.

18. The refrigerator according to claim 17, wherein the sealing member is made of a same material as the first and second plates and is welded to at least one of the first plate or the second plate at the opening.

19. The refrigerator according to claim 17, wherein a filler is provided inside of the sealing member to prevent the alternating current line from contacting the sealing member.

20. The refrigerator according to claim 13, further comprising a cover configured to cover the opening so that the opening is not exposed to at least one of the inner space or the exterior space.

21. A vacuum adiabatic body comprising:
a first plate having a first opening to a first space:
a second plate having a second opening to a second space:
a vacuum space provided between the first plate and the second plate;
a support configured to maintain a distance between the first plate and the second plate, the support being disposed next to or adjacent to the first plate;
an electric line passing through the first and second openings to allow current to flow between the first space and the second space; and
a sealing plug configured to surround the electric line and to be inserted into the first and second openings,
wherein the sealing plug includes a first portion disposed in the first space and a second portion disposed in the second space such that the sealing plug is configured to seal the first and second openings respectively.

22. A refrigerator comprising:
a vacuum adiabatic body including a first plate configured to define at least a portion of a wall for a first space, a second plate configured to define at least a portion of a wall for a second space and a vacuum space provided between the first plate and the second plate;
a door configured to open or close an opening of the first space;
a support configured to maintain a distance between the first plate and the second plate, the support being disposed next to or adjacent to the first plate;
at least one first electronic device provided in the first space;
at least one second electronic device provided in the second space;
a first controller provided in the first space to transmit or receive a signal to or from the first electronic device;
a second controller provided in the second space to transmit or receive a signal to or from the second electronic device;

an opening formed in the vacuum adiabatic body; and at least one wiring configured to pass through the opening, or to pass through a gap between the vacuum adiabatic body and the door.

23. The refrigerator according to claim 22, wherein the at least one wiring comprises a plurality of third wirings including a first wire to guide current flow and a second wire to transmit a signal.

24. A vacuum adiabatic body comprising:

a first plate having a first opening:

a second plate having a second opening:

a vacuum space provided between the first plate and the second plate;

a support configured to maintain a distance between the first plate and the second plate, the support being disposed next to or adjacent to the first plate;

an electric line passing through the first and second openings; and a sealing plug configured to be inserted into the first and second openings, wherein the sealing plug includes a first block configured to surround a first portion of periphery of the electric line and a second block configured to surround a second portion of periphery of the electric line, and wherein the first block is coupled to the second block.

* * * * *